United States Patent
Tellakula

(10) Patent No.: US 12,497,556 B2
(45) Date of Patent: *Dec. 16, 2025

(54) EMULSIONS INCLUDING POLYMERS, TREATMENT FLUIDS INCLUDING EMULSIONS, AND METHODS FOR TREATING SUBTERRANEAN FORMATIONS

(71) Applicant: Sterling Specialty Chemicals Holding UK Limited, Middlesex (GB)

(72) Inventor: Roopa Tellakula, Suwanee, GA (US)

(73) Assignee: STERLING SPECIALTY CHEMICALS HOLDING UK LIMITED (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/506,190

(22) Filed: Nov. 10, 2023

(65) Prior Publication Data
US 2024/0084190 A1    Mar. 14, 2024

Related U.S. Application Data

(62) Division of application No. 16/323,990, filed as application No. PCT/US2017/049845 on Sep. 1, 2017, now Pat. No. 11,859,128.

(60) Provisional application No. 62/382,347, filed on Sep. 1, 2016.

(51) Int. Cl.
| | |
|---|---|
| *C09K 8/64* | (2006.01) |
| *C09K 8/60* | (2006.01) |
| *C09K 8/68* | (2006.01) |
| *C09K 8/80* | (2006.01) |
| *C09K 8/88* | (2006.01) |
| *E21B 43/16* | (2006.01) |
| *E21B 43/26* | (2006.01) |
| *E21B 43/267* | (2006.01) |

(52) U.S. Cl.
CPC ............. *C09K 8/64* (2013.01); *C09K 8/604* (2013.01); *C09K 8/68* (2013.01); *C09K 8/80* (2013.01); *C09K 8/882* (2013.01); *E21B 43/16* (2013.01); *E21B 43/26* (2013.01); *C09K 2208/28* (2013.01); *E21B 43/267* (2013.01)

(58) Field of Classification Search
CPC . C09K 8/64; C09K 8/604; C09K 8/80; C09K 8/882; C09K 2208/28; E21B 43/26; E21B 43/16; E21B 43/267
See application file for complete search history.

(56) References Cited

U.S. PATENT DOCUMENTS

| | | | |
|---|---|---|---|
| 5,679,740 A * | 10/1997 | Heitner | C02F 1/56 562/587 |
| 6,210,585 B1 | 4/2001 | Tippett | |
| 6,613,720 B1 * | 9/2003 | Feraud | E21B 43/26 166/305.1 |
| 2005/0143506 A1 | 6/2005 | Harrington et al. | |
| 2008/0207780 A1 * | 8/2008 | Wang | C09K 8/604 516/139 |
| 2014/0144643 A1 | 5/2014 | Frederick | |
| 2014/0348887 A1 | 11/2014 | Hsu | |
| 2015/0133347 A1 | 5/2015 | Chung et al. | |
| 2016/0017203 A1 * | 1/2016 | Frederick | C09K 8/64 507/120 |
| 2017/0096597 A1 | 4/2017 | Hu | |
| 2017/0158948 A1 | 6/2017 | Kim | |

FOREIGN PATENT DOCUMENTS

| | | |
|---|---|---|
| WO | 2008020212 A1 | 2/2008 |
| WO | 2016/109333 A1 | 7/2016 |
| WO | 2016/109348 A1 | 7/2016 |
| WO | 2017100329 A1 | 6/2017 |

OTHER PUBLICATIONS

Cambiella A et al, "The effect of emulsifier concentration on the lubricating properties of oil-in-water emulsions", Tribology Letters, Kluwer Academic Publishers—Plenum Publishers, NE, (Jun. 7, 2006), vol. 22, No. 1, doi:10.1007/S11249-006-9072-1, ISSN 1573-2711, pp. 53-65, XP019409617.
Migahed, Effectiveness of some non ionic surfactants as corrosion inhibitors for carbon steel pipelines in oil fields, Mar. 26, 2005, Elsevier Sience Direct, pp. 4683-4689 (Year: 2005).
International Search Report from PCT/US2017/049845, dated Nov. 16, 2017.
Canadian Notice of Allowance issued in App. No. CA3035441, dated May 14, 2024, 1 page.
International Search Report and Written Opinion for PCT/US20217/049845, dated Nov. 16, 2017.

* cited by examiner

*Primary Examiner* — Silvana C Runyan
(74) *Attorney, Agent, or Firm* — Dilworth IP, LLC

(57) ABSTRACT

Emulsions, treatment fluids and methods for treating subterranean formations are provided, wherein the emulsions comprise water, a water-immiscible liquid, one or more polymers, and an inverting surfactant composition comprising one or more surfactants selected from the group consisting of ethoxylated amine compounds, ethoxylated fatty acid compounds, and alkyl polyethyleneglycol ether carboxylic acid compounds, alkyl polyglycol ether carboxylic acid compounds, and salts or esters thereof. The emulsions are particularly suitable for use in brine.

19 Claims, 7 Drawing Sheets

EMULSIONS INCLUDING POLYMERS, TREATMENT FLUIDS INCLUDING EMULSIONS, AND METHODS FOR TREATING SUBTERRANEAN FORMATIONS

CROSS REFERENCE TO RELATED APPLICATIONS

This application is a Divisional of U.S. application Ser. No. 16/323,990, filed Feb. 7, 2019, published as U.S. Patent Application Publication 2024/0084190 dated Mar. 14, 2024, now U.S. Pat. No. 11,859,128 dated Jan. 2, 2024, which is the U.S. National Stage Entry of International Patent Application No. PCT/US2017/049845, filed Sep. 1, 2017, which claims priority to U.S. Provisional Application No. 62/382,347, filed Sep. 1, 2016, each of which are incorporated herein by reference.

FIELD OF THE ART

The present disclosure generally relates to emulsions, treatment fluids and methods for treating subterranean formations.

BACKGROUND

In the drilling, completion, and stimulation of oil and gas wells, well treatment fluids are often pumped into well bore holes under high pressure and at high flow rates causing the rock formation surrounding the well bore to fracture. As the fluid is pumped through the pipe at high flow rates (thousands of GPM) there is a significant amount of frictional resistance, which results in large energy requirements.

In order to reduce the friction between the well treatment fluid and the bore linings, friction pressure reducing additives have been combined with the treatment fluids and added during pumping so as to reduce pump pressure. For example, a type of well treatment commonly utilized for stimulating hydrocarbon production from a subterranean zone penetrated by a well bore is hydraulic fracturing. Hydraulic fracturing, also referred to as fracing (or fracking), is used to initiate production in low-permeability reservoirs and re-stimulate production in older producing wells. In hydraulic fracing, a fluid composition is injected into the well at pressures effective to cause fractures in the surrounding rock formation. Fracing is used both to open up fractures already present in the formation and create new fractures.

Water soluble polymers can be used as friction reducers in well treatment fluids to alter the rheological properties of the fluid so that the turbulent flow is reduced, thereby preventing consequent energy loss in the fluid as it is pumped through the pipe. These types of treatments are often called "slick water treatments or slick water fracs." In some instances, water soluble friction reducing polymers are suspended in water in oil emulsions, wherein upon addition to the aqueous treatment fluid, the emulsion must invert to release the friction reducing polymer into the fluid. Performance in the field depends (at least in part) upon the ability of the emulsions to invert, or break, quickly. Certain conditions, for example high brine conditions, can hinder the breaking of the emulsion. In particular, high brines including potassium chloride, sodium chloride, seawater and other API base brines that include barium, strontium, iron, calcium or magnesium hardness can interfere with the inversion of emulsion polymers.

BRIEF SUMMARY

Disclosed herein are emulsions comprising: water; a water-immiscible liquid; greater than about 10% by weight one or more polymers; about 0.1% to about 5% by weight of an inverting surfactant composition comprising one or more surfactants selected from the group consisting of ethoxylated amine compounds, ethoxylated fatty acid compounds, and alkyl polyethyleneglycol ether carboxylic acid compounds, alkyl polyglycol ether carboxylic acid compounds, and salts or esters thereof.

Treatment fluids comprising the emulsions, as well as methods for treating subterranean formations with the emulsions or treatment fluids, are also provided.

The disclosure may be understood more readily by reference to the following detailed description of the various features of the disclosure and the examples included therein.

DETAILED DESCRIPTION

Figure 1:
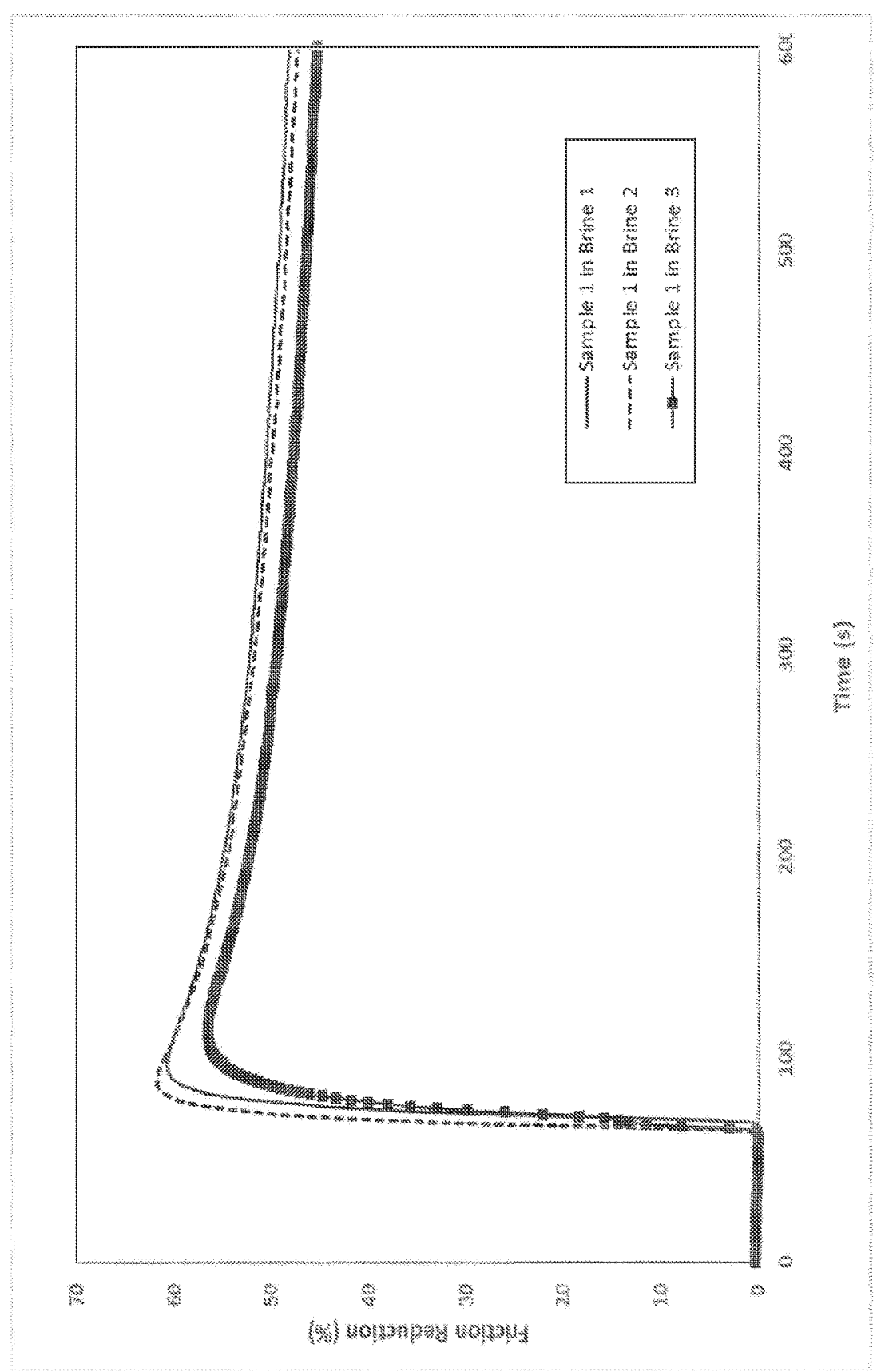
FIGS. 1, 2 and 3 show the friction reduction profiles of samples of cationic emulsion polyacrylamides with an exemplary inverting surfactant composition in three different brines.
Figure 2:
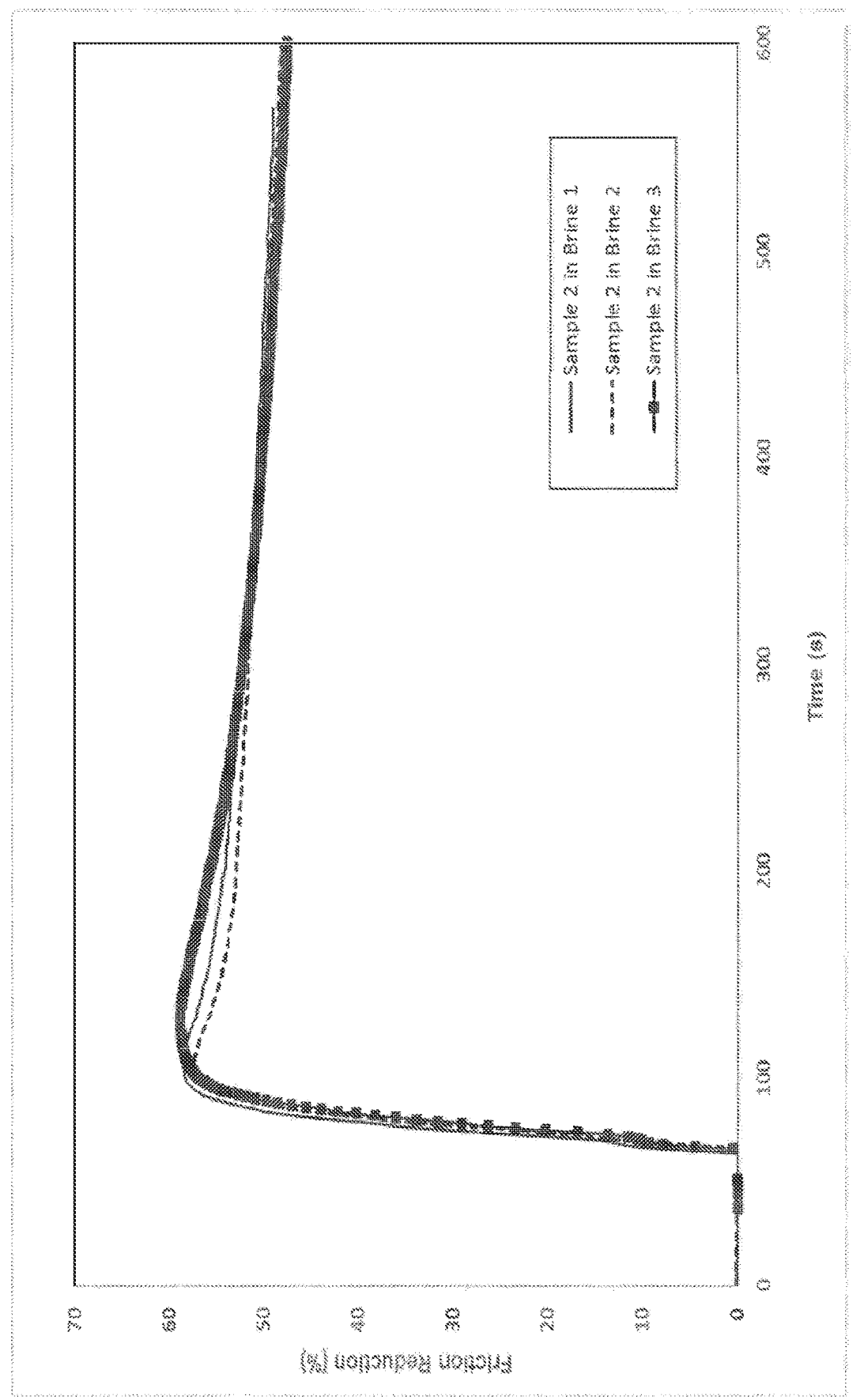
Figure 3:
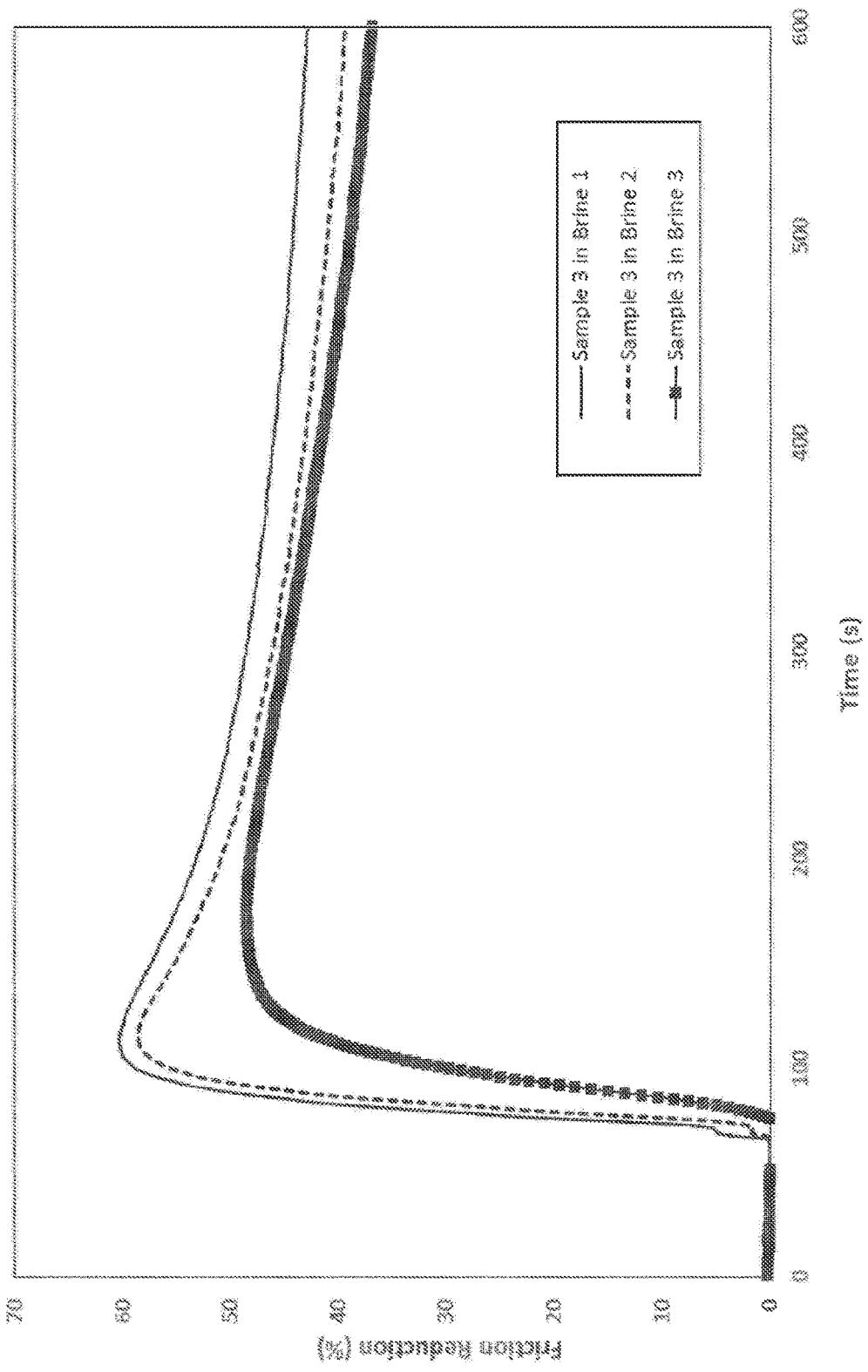
Figure 4:
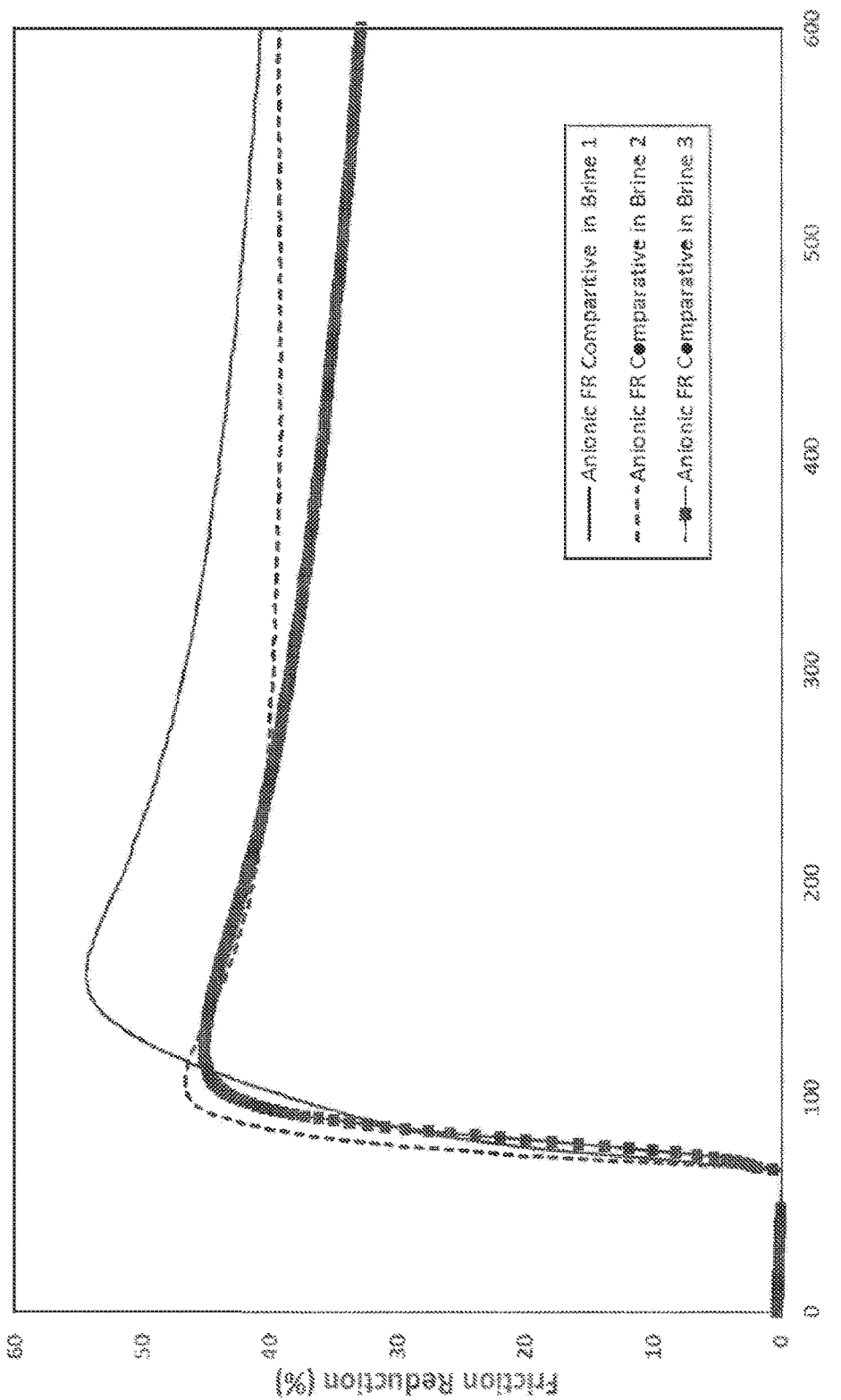
FIGS. 4 and 5 show the friction reduction profiles of samples of cationic emulsion polyacrylamides with a comparative inverting surfactant (anionic or cationic) in three different brines.
Figure 5:
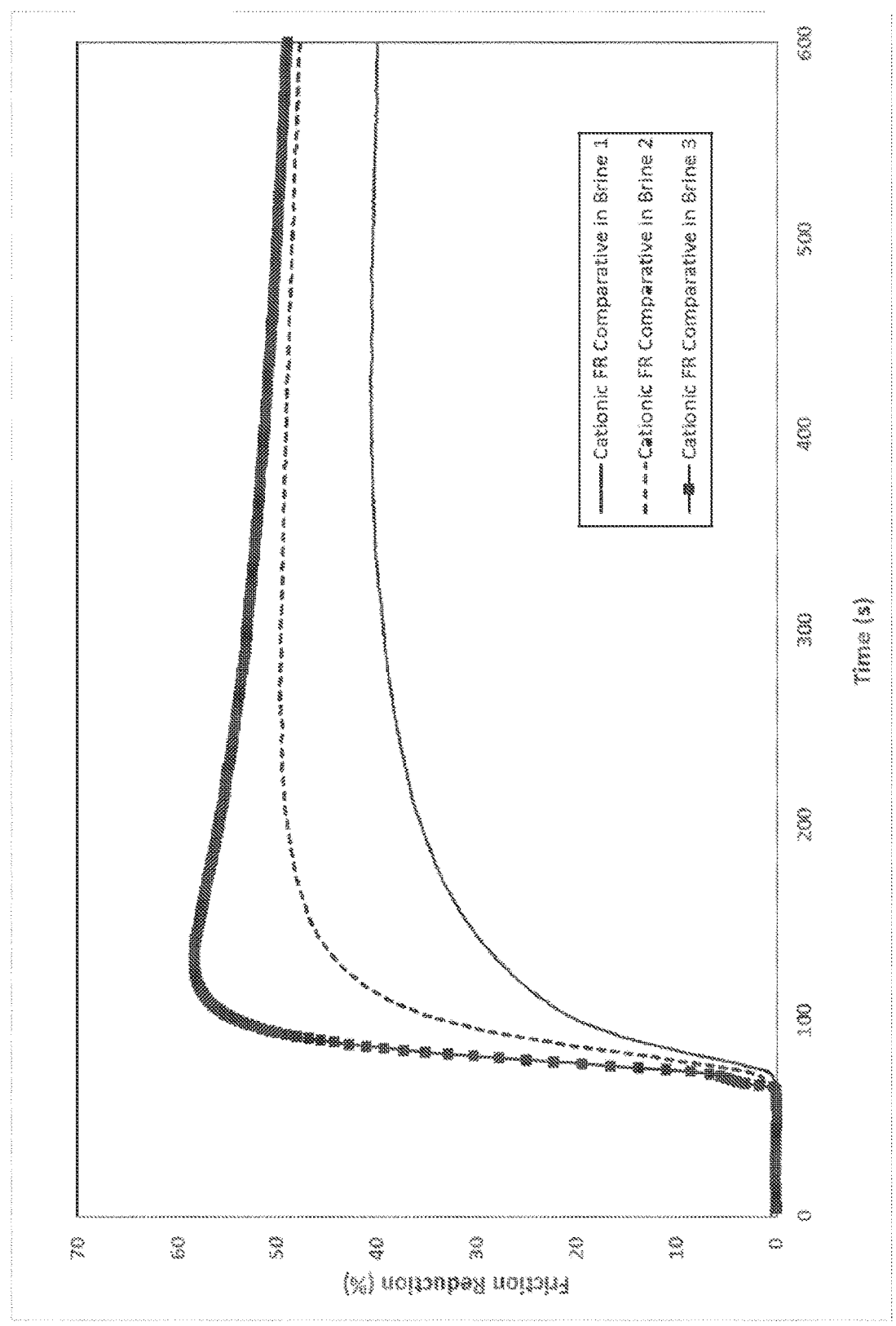

The present disclosure provides aqueous treatment fluids and methods for their use in aqueous brines. The aqueous treatment fluids utilize an advantageous combination of a water soluble polymer, which can be anionic, cationic, amphoteric or non-ionic, and an inverting surfactant composition which comprises one or more surfactants selected from the group consisting of ethoxylated amine compounds, ethoxylated fatty acid compounds, and alkyl polyethyleneglycol ether carboxylic acid compounds, alkyl polyglycol ether carboxylic acid compounds, and salts or esters thereof.

The exemplary emulsions, treatment fluids and methods may be used to provide rapid and enhanced friction reduction in aqueous brines, for example in harsh brine conditions. The exemplary emulsions, treatment fluids and methods may be used at a range of temperatures, even at low temperatures, without loss of polymer performance.

In exemplary embodiments, the emulsions, treatment fluids and methods can be used to carry proppants into fractures, for example in fracturing applications. High molecular weight polyacrylamides are commonly used in fracturing applications as a friction reducer. Generally, crosslinked fluids are used to carry proppants into the fractures, which typically requires additional chemicals, such as crosslinkers, buffers and breakers, to be incorporated into the fracturing fluid. In exemplary embodiments, the emulsions and treatment fluid can be used to carry proppant while minimizing the use of other chemicals or additives typically required by crosslinked fluids.

In slickwater fracturing, the water is made slick by adding friction reducer. Slickwater frac fluids typically have low viscosities; a higher injection flow rate can be used to carry proppant. The exemplary emulsions, treatment fluids and methods can be used in slickwater fracturing applications. Advantageously, the exemplary emulsions and treatment fluids can be used in high brines with very fast inversion of the emulsion, very good friction reduction and with good proppant carrying capabilities at higher loadings.

Polymers

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. A polymer may also be a "terpolymer" which comprises three or more different recurring units. The term "polymer" as used herein is intended to include both the acid form of the polymer as well as its various salts.

In exemplary embodiments, the polymer is an emulsion polyacrylamide, for example an emulsion polyacrylamide that can be used as a friction-reducing polymer. The term "friction reducing polymer" refers to a polymer that reduces energy losses due to friction between an aqueous fluid in turbulent flow and tubular goods, e.g. pipes, coiled tubing, and the like, and/or formation. The friction reducing polymer is not intended to be limited to any particular type and may be synthetic polymers, natural polymers, or viscoelastic surfactants. Suitable friction reducing polymers are typically latex polymers or copolymers of acrylamides, acrylates, guar gum, polyethylene oxide, and combinations thereof. The friction reducing polymers may be anionic, cationic, amphoteric or non-ionic depending on desired application. In addition, various combinations can be used including but not limited to hydrophilic/hydrophobic combinations, functionalized natural and/or synthetic blends of the above, or the like. In certain exemplary embodiments, the friction reducing polymer is anionic. In certain exemplary embodiments, the friction reducing polymer is cationic. In certain exemplary embodiments, the friction reducing polymer is non-ionic. In certain exemplary embodiments, the friction reducing polymer is amphoteric.

In exemplary embodiments, the polymer is a polymer useful in emulsion compositions or an emulsion polymer.

In exemplary embodiments, the polymer is an emulsion polyacrylamide (EPAM). EPAMs are generally inverse emulsions (water-in-oil) in which water droplets containing the polymer are suspended in an oil phase.

In exemplary embodiments, the polymer is a polymer useful for enhanced oil recovery applications. The term "enhanced oil recovery" or "EOR" (also known as tertiary mineral oil production) refers to a process for mineral oil production in which an aqueous injection fluid comprising at least a water soluble polymer is injected into a mineral oil deposit. The techniques of tertiary mineral oil production include what is known as "polymer flooding". Polymer flooding involves injecting an aqueous solution of a water-soluble thickening polymer through the injection boreholes into the mineral oil deposit. As a result of the injection of the polymer solution, the mineral oil is forced through the cavities in the formation, proceeding from the injection borehole, in the direction of the production borehole, and the mineral oil is produced through the production borehole. By virtue of the fact that the polymer formulation has an increased viscosity as compared to the viscosity of water, the risk is reduced that the polymer formulation breaks through to the production borehole. It is thus possible to mobilize additional mineral oil in the formation. Details of polymer flooding and of polymers suitable for this purpose are disclosed, for example, in "Petroleum, Enhanced Oil Recovery, Kirk-Othmer, Encyclopedia of Chemical Technology, online edition, John Wiley & Sons, 2010". For polymer flooding, a multitude of different water-soluble thickening polymers have been proposed, especially high molecular weight polyacrylamide, copolymers of acrylamide and further comonomers, for example vinyl sulfonic acid or acrylic acid. Polyacrylamide may be partly hydrolyzed polyacrylamide, in which some of the acrylamide units have been hydrolyzed to acrylic acid. It is known in the art to use inverse emulsions of polyacrylamide (co)polymers for enhanced oil recovery (EOR) in particular for use on offshore platforms. Such inverse emulsions typically comprise about 30 wt. % of polymers. For use inverse emulsions are simply diluted with water to the final concentration of the polymer.

In exemplary embodiments, the one or more polymers is water soluble. In exemplary embodiments, the one or more polymers comprises an acrylamide-containing polymer. In exemplary embodiments, the one or more polymers consists essentially of acrylamide-containing polymers. In exemplary embodiments, the one or more polymers comprises polyacrylamide, copolymers of acrylamide, sulfonated polyacrylamide, cationic polyacrylamide, anionic polyacrylamide, and partially hydrolyzed acrylamide. In exemplary embodiments, the one or more polymers comprises acrylamide or partially hydrolyzed acrylamide and one or more nonionic and/or anionic monomers.

Suitable non-ionic monomers include but are not limited to acrylamide, N-alkylacrylamides, N,N-dialkylacrylamides, methacrylamide, N-vinylmethylacetamide or formamide, vinyl acetate, vinyl pyrrolidone, alkyl methacrylates, acrylonitrile, N-vinylpyrrolidone other acrylic (or other ethylenically unsaturated) ester or other water insoluble vinyl monomers such as styrene or acrylonitrile.

The term "anionic monomer" refers to a monomer which possesses a negative charge. Representative anionic monomers include acrylic acid, sodium acrylate, ammonium acrylate, methacrylic acid, 2-acrylamido-2-methylpropane-sulfonic acid (AMPS), vinyl sulfonic acid, styrene sulfonic acid, maleic acid, sulfopropyl acrylate or methacrylate or other water-soluble forms of these or other polymerizable carboxylic or sulphonic acids, sulfomethylated acrylamide, allyl sulfonate, itaconic acid, acrylamidomethylbutanoic acid, fumaric acid, vinylphosphonic acid, allylphosphonic acid, phosphonomethylated acrylamide, methacrylate, itaconate, 2-acrylamido 2-methyl propane sulphonate, sulfoalkyl(meth)acrylic acids, sulfonated styrenes, unsaturated dicarboxylic acids, sulfoalkyl(meth)acrylamides, vinyl acetate, n-vinylformamide, n-vinylacetamide, n-vinylcaprolactam, n-vinylimidazole, n-vinylpyridine, n-vinylpyrolidone, acrylamidopropyltrimonium chloride, salts of said acids and the like, or another anionic ethylenically unsaturated compound.

In a particular embodiment, the one or more polymers comprises acrylamide or partially hydrolyzed acrylamide and one or more anionic monomers. In exemplary embodiments, the one or more polymers has an overall anionic charge and comprises acrylamide or partially hydrolyzed acrylamide and one or more nonionic and/or anionic monomers. In exemplary embodiments, the one or more polymers comprises about 5% to about 60% anionic monomers by weight. In exemplary embodiments, the one or more polymers comprises an anionic polyacrylamide. In exemplary embodiments, the anionic polyacrylamide is a copolymer comprising one or more anionic monomers and acrylamide monomers. Exemplary salts of these anionic monomers include but are not limited to sodium and ammonium salts. In one embodiment, the polymer is an anionic polymer. In a particular embodiment, the anionic polymer has about 5% to about 60% charge, about 1 0% to about 50% charge, about 15% to about 45% charge, about 20% to about 40% charge, about 1 0% to about 15% charge, or about 25% to about 35% charge.

In exemplary embodiments, the one or more polymers comprises acrylamide or partially hydrolyzed acrylamide and one or more cationic monomers.

The term "cationic monomer" refers to a monomer which possesses a positive charge. Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, acryloyloxyethyltrimethylammonium chloride, diethylaminoethylacrylate, diethylaminoethylmethacrylate and diallyldialkylammonium halides such as diallyldiethylammonium chloride and diallyldimethyl ammonium chloride. Alkyl groups are generally $C_{1-8}$ alkyl.

In a particular embodiment, the one or more polymers comprises acrylamide or partially hydrolyzed acrylamide and one or more cationic monomers. In a particular embodiment, the one or more polymers comprises acrylamide or partially hydrolyzed acrylamide and acryloyloxyethyltrimethylammonium chloride. In exemplary embodiments, the one or more polymers has an overall cationic charge and comprises acrylamide or partially hydrolyzed acrylamide and one or more cationic monomers. In exemplary embodiments, the one or more polymers comprises about 5% to about 60% cationic monomers by weight. In exemplary embodiments, the one or more polymers comprises a cationic polyacrylamide. In exemplary embodiments, the cationic polyacrylamide is a copolymer comprising one or more cationic monomers and acrylamide monomers. In one embodiment, the polymer is a cationic polymer.

In exemplary embodiments, the partially hydrolyzed acrylamide is acrylamide wherein about 3% to about 70% of the amide groups have been hydrolyzed to carboxyl groups.

In one embodiment, the one or more polymers comprises an amphoteric polymer. In one embodiment, the one or more polymers comprises a non-ionic polymer.

In exemplary embodiments, the one or more polymers comprises acrylamide or partially hydrolyzed acrylamide and one or more monomers selected from the group consisting of acrylic acid, acrylate salt, 2-acrylamido-2-methylpropane sulfonic acid, N,N-dimethylacrylamide, vinyl sulfonic acid, N-vinyl sulfonic acetamide, N-vinyl formamide, itaconic acid, methacrylic acid, acryloyloxyethyltrimethylammonium chloride, salts thereof, and combinations thereof. In a particular embodiment, the one or more polymers comprises acrylamide or partially hydrolyzed acrylamide and one or more monomers selected from the group consisting of acrylic acid, 2-acrylamido-2-methylpropane sulfonic acid, and methacrylic acid, and salts thereof. In a particular embodiment, the one or more polymers comprises acrylamide or partially hydrolyzed acrylamide and one or more monomers selected from the group consisting of acrylic acid and salts thereof.

In certain embodiments, the polymer comprises acrylamide and one or more monomers selected from the group consisting of: acrylic acid and its salts, methacrylamide, methacrylic acid and its salts, maleic acid and its salts, methyl acrylate, ethyl acrylate, propyl acrylate, methyl methacrylate, ethyl methacrylate, dimethylaminoethyl acrylate and its methylchloride and methosulfate quaternaries, dimethylaminoethyl methacrylate and its methylchloride and methosulfate quaternaries, diethylaminoethyl acrylate and its methylchloride and methosulfate quaternaries, diethylaminoethyl methacrylate and its methylchloride and methosulfate quaternaries, hydroxyethyl acrylate, hydroxyethyl methacrylate, styrene, acrylonitrile, 2-acrylamido-2-methylpropane sulfonic acid and its salts, 3-(methylacrylamido)-propyltrimethylammonium chloride, dimethylaminopropylmethacrylamide, isopropylaminopropylmethacrylamide, methacrylamidopropylhydroxyethyldimethylammonium acetate, vinyl methyl ether, vinyl ethyl ether, alkali metal and ammonium salts of vinyl sulfonic acid, vinyl pyridine, vinyl pyrrolidone, vinyl imidazole, diallyldimethylammonium chloride, styrene sulfonic acid and its salts, and the like.

In exemplary embodiments, one or more polymers is a copolymer of acrylamide or partially hydrolyzed acrylamide and one or more anionic monomers. In exemplary embodiments, the one or more polymers comprises at least about 40 mole %, about 50 mole %, about mole 60%, about mole 70%, about mole 80%, or about mole 90% acrylamide or partially hydrolyzed acrylamide. In exemplary embodiments, the one or more polymers comprises at least about 5 mole %, about 10 mole %, about 20 mole %, about 30 mole %, about 40 mole %, about 50 mole %, or about 55 mole % one or more anionic monomers. In exemplary embodiments, the one or more polymers comprises about 40 mole % to about 95 mole %, or about 60 mole % to about 90 mole %, acrylamide or partially hydrolyzed acrylamide. In exemplary embodiments, the one or more polymers comprises about 5 mole % to about 60 mole %, or about 10 mole % to about 40 mole %, one or more anionic monomers.

In exemplary embodiments, one or more polymers is a copolymer of acrylamide or partially hydrolyzed acrylamide and one or more cationic monomers. In exemplary embodiments, the one or more polymers comprises at least about 40 mole %, about 50 mole %, about mole 60%, about mole 70%, about mole 80%, or about mole 90% acrylamide or partially hydrolyzed acrylamide. In exemplary embodiments, the one or more polymers comprises at least about 5 mole %, about 10 mole %, about 20 mole %, about 30 mole %, about 40 mole %, about 50 mole %, or about 55 mole % one or more cationic monomers. In exemplary embodiments, the one or more polymers comprises about 40 mole % to about 95 mole %, or about 60 mole % to about 90 mole %, acrylamide or partially hydrolyzed acrylamide. In exemplary embodiments, the one or more polymers comprises about 5 mole % to about 60 mole %, or about 10 mole % to about 40 mole %, one or more cationic monomers.

In exemplary embodiments, one or more polymers 1s a copolymer of acrylamide or partially hydrolyzed acrylamide and acrylic acid or an acrylate salt. In exemplary embodiments, the one or more polymers comprises at least about 40 mole %, about 50 mole %, about mole 60%, about mole 70%, about mole 80%, or about mole 90% acrylamide or partially hydrolyzed acrylamide. In exemplary embodiments, the one or more polymers comprises at least about 5 mole %, about 10 mole %, about 20 mole %, about 30 mole %, about 40 mole %, about 50 mole %, or about 55 mole % acrylic acid or acrylate salts. In exemplary embodiments, the acrylate salt comprises ammonium acrylate. In exemplary embodiments, the one or more polymers comprises about 40 mole % to about 95 mole %, or about 60 mole % to about 90 mole %, acrylamide or partially hydrolyzed acrylamide. In exemplary embodiments, the one or more polymers comprises about 5 mole % to about 60 mole %, or about 10 mole % to about 40 mole %, acrylic acid or an acrylate salt.

The exemplary polymers may be included in the treatment fluids in an amount sufficient to provide the desired properties. In some embodiments, a polymer may be present in an amount in the range of about 0.1 to about 10, about 0.1 to about 6, about 0.1 to about 5, or about 0.25 to about 1, Gallons Per Thousand Gallons of the aqueous treatment fluid (GPTG). The polymers may be added to slick water treatments at concentrations of about 0.1 to about 20 GPTG, of treatment fluid. In other embodiments, the polymer is added at a concentration of about 0.25 to about 6 GPTG of treatment fluid.

The polymers of the present embodiments should have a molecular weight sufficient to provide desired properties. For example, those polymers used for friction reduction should have higher molecular weights to provide a desirable level of friction reduction. The polymers used for EOR applications should have sufficient molecular weight to provide the desired viscosity to mobilize oil in a desirable manner. In some exemplary embodiments, the weight average molecular weight of a polymer may be in the range of from about 7,500,000 to about 30,000,000 Dalton. Those of ordinary skill in the art will recognize that polymers having molecular weights outside the listed range may still provide desirable properties in the aqueous treatment fluid.

In exemplary embodiments, the polymer is used for EOR applications.

Suitable polymers of the present embodiments may be in an acid form or in a salt form. A variety of salts may be made by neutralizing the acid form of a monomer, for example acrylic acid or 2-acrylamido-2-methylpropane sulfonic acid, with a base, such as sodium hydroxide, ammonium hydroxide or the like. As used herein, the term "polymer" is intended to include both the acid form of the copolymer and its various salts.

Inverting Surfactant Composition

In exemplary embodiments, in addition to the one or more polymers, the emulsion or aqueous treatment fluid comprises an inverting surfactant composition. Among other things, an inverting surfactant or inverting surfactant composition may facilitate the inverting of the emulsion upon addition to the treatment fluids of the present embodiments. As those of ordinary skill in the art will appreciate, with the benefit of this disclosure, upon addition to the treatment fluid, the emulsion should invert, releasing the polymer into the treatment fluid.

In exemplary embodiments, the inverting surfactant composition comprises one or more surfactants selected from the group consisting of Surfactant A compounds, Surfactant B compounds, and Surfactant C compounds, as described herein. In certain exemplary embodiments, the inverting surfactant composition comprises one or more surfactants selected from the group consisting of Surfactant A compounds. In certain exemplary embodiments, the inverting surfactant composition comprises one or more surfactants selected from the group consisting of Surfactant B compounds.

In exemplary embodiments, the inverting surfactant composition comprises two or more surfactants selected from the group consisting of Surfactant A compounds, Surfactant B compounds, and Surfactant C compounds, as described herein.

In exemplary embodiments, the inverting surfactant composition comprises one or more Surfactant A compounds. In exemplary embodiments, the inverting surfactant composition comprises one or more Surfactant B compounds. In exemplary embodiments, the inverting surfactant composition comprises one or more Surfactant C compounds.

In exemplary embodiments, the inverting surfactant composition comprises one or more Surfactant A compounds and one or more Surfactant B compounds. In exemplary embodiments, the inverting surfactant composition comprises one or more Surfactant A compounds and one or more Surfactant C compounds. In exemplary embodiments, the inverting surfactant composition comprises one or more Surfactant B compounds and one or more Surfactant C compounds. In exemplary embodiments, the inverting surfactant composition comprises two or more types of Surfactant B compounds.

In exemplary embodiments, the inverting surfactant composition comprises one or more Surfactant A compounds, one or more Surfactant B compounds, and one or more Surfactant C compounds. In exemplary embodiments, the inverting surfactant composition comprises one or more Surfactant A compounds, two or more types of Surfactant B compounds. In exemplary embodiments, the inverting surfactant composition comprises one or more Surfactant C compounds, two or more types of Surfactant B compounds.

In exemplary embodiments, the inverting surfactant composition comprises one or more Surfactant A compounds, two or more types of Surfactant B compounds, one or more Surfactant C compounds.

In exemplary embodiments, the inverting surfactant composition may comprise other inverting surfactants in addition to those chosen from Surfactant A, Surfactant B, and Surfactant C compounds. Representative inverting surfactants that may also be added to the exemplary emulsions include those having a hydrophilic-lipophilic balance (HLB) of greater than 10; polyoxyethylene sorbitol tetraoleate; polyethylene glycol monoleate; ethoxylated alcohols, such as $C_{12-14}$ branched ethoxylated alcohol, ethoxylated octyl and nonyl phenols; ethoxylated nonyl phenol formaldehyde resin; polyethylene oxide esters of fatty acids; dioctyl esters of sodium sulfosuccinate; and other inverting surfactants disclosed in U.S. Pat. No. 3,624,019 incorporated herein by reference. The inverting surfactant should be present in an amount sufficient to provide the desired inversion of the emulsion upon contact with the water in the aqueous treatment fluid.

In exemplary embodiments, the inverting surfactant composition comprises 0 to about 100%, 0 to about 75%, or about 5 to about 75 wt %, of Surfactant A compounds. In exemplary embodiments, the inverting surfactant composition comprises at least about 5, about 10, about 15, about 20, about 25, about 30, about 35, about 40, about 50, about 55, about 60, about 65, about 70, about 75, about 80, about 85, about 90, or about 95 wt % of Surfactant A compounds, when Surfactant A is included in the composition. In certain exemplary embodiments, the inverting surfactant composition does not comprise Surfactant A compounds.

In exemplary embodiments, the inverting surfactant composition comprises 0 to about 100%, 0 to about 75%, or about 5 to about 75 wt %, of Surfactant B compounds. In exemplary embodiments, the inverting surfactant composition comprises at least about 5, about 10, about 15, about 20, about 25, about 30, about 35, about 40, about 50, about 55, about 60, about 65, about 70, about 75, about 80, about 85, about 90, or about 95 wt % of Surfactant B compounds, when Surfactant B is included in the composition. In certain exemplary embodiments, the inverting surfactant composition does not comprise Surfactant B compounds.

In exemplary embodiments, the inverting surfactant composition comprises 0 to about 75%, or about 5 to about 50 wt %, of Surfactant C compounds. In exemplary embodiments, the inverting surfactant composition comprises at least about 5, about 10, about 15, about 20, about 25, about 30, about 35, about 40, or about 50 wt % of Surfactant C compounds, when Surfactant C is included in the composition. In certain exemplary embodiments, the inverting surfactant composition does not comprise Surfactant C compounds.

In certain exemplary embodiments, the inverting surfactant composition comprises or consists essentially of about 5 to about 95 wt % one or more Surfactant A compounds and about 5 to about 95 wt % one or more Surfactant B compounds. In certain exemplary embodiments, the inverting surfactant composition comprises or consists essentially of about 25 to about 35 wt % one or more Surfactant A compounds and about 65 to about 75 wt % one or more Surfactant B compounds.

In certain exemplary embodiments, the inverting surfactant composition comprises or consists essentially of about 5 to about 95 wt % one or more Surfactant A compounds and about 5 to about 75 wt % one or more Surfactant C compounds. In certain exemplary embodiments, the inverting surfactant composition comprises or consists essentially of about 5 to about 95 wt % one or more Surfactant B compounds and about 5 to about 75 wt % one or more Surfactant C compounds. In certain exemplary embodiments, the inverting surfactant composition comprises or consists essentially of about 25 to about 65, about 25 to about 55, about 30 to about 50, or about 30 to about 60, wt % one or more Surfactant B compounds and about 35 to about 75, about 45 to about 75, about 40 to about 70, about 50 to about 70 wt % one or more Surfactant C compounds.

In certain exemplary embodiments, the inverting surfactant composition comprises or consists essentially of about 5 to about 95 wt % one or more Surfactant B compounds and about 5 to about 95 wt % a different Surfactant B compound.

In certain exemplary embodiments, the inverting surfactant composition comprises or consists essentially of about 5 to about 90 wt % one or more Surfactant A compounds, about 5 to about 90 wt % one or more Surfactant B compounds and about 5 to about 75 wt % one or more Surfactant C compounds. In certain exemplary embodiments, the inverting surfactant composition comprises or consists essentially of about 5 to about 35, or about 10 to about 30, wt % one or more Surfactant A compounds; about 25 to about 70, or about 30 to about 60, wt % one or more Surfactant B compounds; and about 15 to about 70, about 15 to about 55, about 20 to about 50, about 35 to about 65, or about 40 to about 60, wt % one or more Surfactant C compounds. In certain exemplary embodiments, the inverting surfactant composition comprises or consists essentially of about 15 to about 35, about 25 to to about 35, about 20 to about 30, about 15 to about 25, or about 5 to about 15, wt % one or more Surfactant A compounds; about 15 to about 45, about 35 to about 45; about 45 to about 55, about 55 to about 65, about 65 to about 75, or about 20 to about 40, wt % one or more Surfactant B compounds; and about 15 to about 65, about 15 to about 25, about 25 to about 35, about 35 to about 45, about 45 to about 55, about 55 to about 65, or about 30 to about 50, wt % one or more Surfactant C compounds.

In certain exemplary embodiments, the inverting surfactant composition comprises or consists essentially of about 5 to about 75 wt % one or more Surfactant A compounds, about 5 to about 75 wt % two or more types of Surfactant B compounds, and about 5 to about 75 wt % one or more Surfactant C compounds. In a particular embodiment, the inverting surfactant composition comprises or consists essentially of about 25 to about 35, or about 28 to about 32, wt % one or more Surfactant A compounds, about 25 to about 35, or about 28 to about 32, wt % one or more Surfactant B compounds, about 25 to about 35, or about 28 to about 32, wt % one or more Surfactant C compounds and about 5 to about 15, or about 8 to about 12, wt % of a different Surfactant B compound.

Surfactant A

In exemplary embodiments, the emulsion or aqueous treatment fluid comprises one or more Surfactant A compounds. In exemplary embodiments, Surfactant A compounds are selected from ethoxylated amine compounds, such as ethoxylated tallow amine compounds. As referred to herein, "ethoxylated amine compounds" includes, for example, amine or amide compounds comprising two ethoxy or polyethoxy groups and one group selected from hydrogen, alkyl, aryl, C(=O)-alkyl or C(=O)-aryl group. In certain exemplary embodiments, the ethoxylated amine compounds are nonionic amine compounds. In certain embodiments, the ethoxylated amine compounds do not comprise cationic polyoxyethylene tallow amine compounds.

In exemplary embodiments the ethoxylated amine compounds are compounds of Formula I:

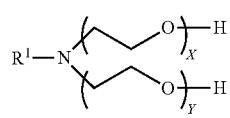

Formula I wherein $R^1$ is H, alkyl, aryl, C(=O)-alkyl, or C(=O)-aryl; and X and Y are each independently 1-20. In exemplary embodiments, an alkyl group is a saturated or unsaturated alkyl group having 8 to 26 carbon atoms. In exemplary embodiments, an aryl group is an aryl group having 6 to 18 carbon atoms. In exemplary embodiments, the alkyl group can be either saturated or unsaturated, and can be derived from, but not limited to, tallow, soybean oil, coconut oil, or cottonseed oil. In exemplary embodiments, the poly(oxyethylene) content (X+Y) of the ethoxylated amine is in the range of 3 to 20.

In certain embodiments, $R^1$ is H. In certain embodiments, $R^1$ is not H. In certain embodiments, $R^1$ is alkyl, for example is a saturated or unsaturated alkyl group having 8 to 26 carbon atoms. In certain embodiments, $R^1$ is C(=O)-alkyl, for example a carbonyl group bonded to the amine nitrogen and to a saturated or unsaturated alkyl group having 8 to 26 carbon atoms, such as N,N-bis(2-hydroxyethyl)-9-octadecenamide.

It should be understood that any numerical range recited herein is intended to include all sub-ranges subsumed therein. For example, a range of "1-10" is intended to include all sub-ranges between and including the recited minimum value of 1 and the recited maximum value of 10. Because the disclosed numerical ranges are continuous, they include every value between the minimum and maximum values.

In exemplary embodiments, the ethoxylated amine compounds is polyethylene fatty acid amine or a mixture of polyethylene fatty acid amine compounds.

In exemplary embodiments, $R^1$ is a residue of a saturated or unsaturated fatty acid, for example a residue of caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic, a-linolenic acid, arachidonic acid, eicosapentaenoic acid, erucic acid, or docosahaxaenoic acid.

In exemplary embodiments, the one or more ethoxylated amine compounds is polyethylene tallow amine. Tallow contains a variety of fatty acids including oleic (37-43%), palmitic (24-32%), stearic (20-25%), myristic (3-6%) and linoleic (2-3%). In exemplary embodiments, the one or more ethoxylated amine compounds includes polyethylene oleic amine, polyethylene palmitic amine, polyethylene stearic amine, polyethylene myristic amine, and polyethylene linoleic amine.

Surfactant B

In exemplary embodiments, the emulsion or aqueous treatment fluid comprises one or more Surfactant B compounds. In exemplary embodiments, Surfactant B compounds are selected from alkyl polyethyleneglycol ether carboxylic acid compounds, alkyl polyglycol ether carboxylic acid compounds, and salts or esters thereof. As referred to herein, Surfactant B compounds include, for example, compounds comprising a $C_8$ to $C_{26}$ unsaturated or saturated alkyl chain substituted with an $(OCH_2CH_2)_yOCH_2CO_2H$ wherein the average value of y is about 2 to about 20, or about 2 to about 10. In certain exemplary embodiments, the alkyl polyglycol ether carboxylic acid compounds are anionic compounds.

In exemplary embodiments, Surfactant B compounds comprise a $C_{14}$ to $C_{22}$ unsaturated alkyl chain, for example an unsaturated alkyl chain derived from a fatty acid residue, such as oleic acid, myristoleic acid, palmitoleic acid, sapienic acid, elaidic acid, vaccenic acid, linoleic acid, a-linoleic acid, linoelaidic, arachidonic acid, eicospentanoic acid, erucic acid, docosahexaenoic acid, and the like. In exemplary embodiments, the Surfactant B is selected from the group consisting of glycolic acid ethoxylate oleyl ether, glycolic acid ethoxylate myristoleyl ether, glycolic acid ethoxylate palmitoleyl ether, glycolic acid ethoxylate sapienyl ether, glycolic acid ethoxylate elaidyl ether, glycolic acid ethoxylate vaccenyl ether, glycolic acid ethoxylated linoleyl ether, glycolic acid ethoxylated a-linoleyl ether, glycolic acid ethoxylate linoelaidyl ether, glycolic acid ethoxylate arachidonyl ether, glycolic acid ethoxylate eicospentanoyl ether, glycolic acid ethoxylate erucyl ether, and glycolic acid ethoxylated docosahexaenoyl ether.

In certain exemplary embodiments, Surfactant B is a compound or a mixture of compounds represented by the formula: $CH_3(CH_2)_xCH=CH(CH_2)_8(OCH_2CH_2)_yOCH_2CO_2H$, wherein x is 1-12 and y is 2-20.

In certain exemplary embodiments, the Surfactant B is glycolic acid ethoxylate oleyl ether. In certain exemplary embodiments, Surfactant B is the mixture of compounds represented by the formula: $CH_3(CH_2)_xCH=CH(CH_2)_8(OCH_2CH_2)_yOCH_2CO_2H$, wherein the average value for x is 5-7 and the average value for y is about 2. In exemplary embodiments, Surfactant B compounds comprise a $C_{14}$ to $C_{22}$ saturated alkyl chain, for example an saturated alkyl chain derived from a fatty acid residue, such as caprylic acid, capric acid, lauric acid, myristic acid, palmitic acid, stearic acid, arachidic acid, behenic acid, lignoceric acid, cerotic acid, and the like. In exemplary embodiments, the Surfactant B is selected from the group consisting of glycolic acid ethoxylate lauryl ether, glycolic acid ethoxylate caprylyl ether, glycolic acid ethoxylate capryl ether, glycolic acid ethoxylate myristyl ether, glycolic acid ethoxylate palmityl ether, glycolic acid ethoxylate stearyl ether, glycolic acid ethoxylated arachidyl ether, glycolic acid ethoxylated behenyl ether, glycolic acid ethoxylate lignoceryl ether, and glycolic acid ethoxylate cerotyl ether.

In certain exemplary embodiments, Surfactant B is a compound or a mixture of compounds represented by the formula: $CH_3(CH_2)_w(OCH_2CH_2)_yOCH_2CO_2H$, wherein w is 6-24 and y is 2-20.

In certain exemplary embodiments, the Surfactant B is a glycolic acid ethoxylate lauryl ether or a polyoxyethylene lauryl ether carboxylic acid or a salt thereof, such as polyoxyethylene(10) lauryl ether carboxylic acid, polyoxyethylene(3) lauryl ether carboxylic acid, polyoxyethylene(5) lauryl ether carboxylic acid, polyoxyethylene(7) lauryl ether carboxylic acid, or polyoxyethylene(4) lauryl ether carboxylic acid.

In certain exemplary embodiments, the Surfactant B is B1 or B2 from the Examples, or a combination thereof.

Surfactant C

In exemplary embodiments, the emulsion or aqueous treatment fluid comprises one or more Surfactant C compounds. In exemplary embodiments, Surfactant C compounds are selected from ethoxylated fatty acid compounds. As referred to herein, "ethoxylated fatty acid compounds" includes, for example, fatty acid compounds which have been reacted with ethylene oxide to form compounds containing at least 20 moles of ethoxy groups per 1 mole of the fatty acid. In certain exemplary embodiments, the ethoxylated fatty acid compounds are unsaturated, for example monounsaturated. In certain exemplary embodiments, the ethoxylated fatty acid compounds are hydroxylated or substituted with one or more hydroxyl groups. In certain exemplary embodiments, the ethoxylated fatty acid compounds are nonionic compounds. In exemplary embodiments, Surfactant C compound contains at least about 20, about 25, about 30, or about 35 units of ethoxylation.

In certain exemplary embodiments, the fatty acid is, for example, a monounsaturated hydroxyl fatty acid, such as Ricinoleic acid. Ricinoleic acid (12-hydroxy-9-cis-octadecenoic acid) is an unsaturated omega-9 fatty acid and a hydroxy acid. It is a major component of the seed oil obtained from mature Castor plant (*Ricinus communis* L., Euphorbiaceae) seeds or in sclerotium of ergot (*Claviceps purpurea* Tul., Clavicipitaceae). About 90% of the fatty acid content in castor oil is the triglyceride formed from ricinoleic acid.

In certain exemplary embodiments, Surfactant C is ethoxylated castor oil.

In exemplary embodiments, the Surfactant C compound is produced by the ethoxylation of fatty acid materials derived from saturated or unsaturated animal or vegetable fats, such as coconut oil, tall oil, stearic fatty acid, oleic fatty acid or adipic fatty acid.

In certain exemplary embodiments, the ethoxylated fatty acid compound is, for example, coconut fatty acid ethoxylate, lauric acid ethoxylate, oleic acid ethoxylate, or myristic acid ethoxylate.

Emulsions

Exemplary emulsions, for example water-in-oil emulsions or oil-external emulsions, may comprise water, a water-immiscible liquid, one or more polymers, and an inverting surfactant composition comprising one or more surfactants selected from the group consisting of Surfactant A compounds, Surfactant B compounds, and Surfactant C compounds, as described herein. In certain exemplary embodiments, the emulsions comprise water, a water-immiscible liquid, one or more polymers, and an inverting surfactant composition comprising one or more Surfactant A compounds. In certain exemplary embodiments, the emulsions comprise water, a water-immiscible liquid, one or more polymers, and an inverting surfactant composition comprising one or more Surfactant B compounds. In certain exemplary embodiments, the emulsions comprise water, a water-immiscible liquid, one or more polymers, and an inverting surfactant composition comprising one or more Surfactant C compounds. In certain exemplary embodiments, the emulsions comprise water, a water-immiscible liquid, one or more polymers, and an inverting surfactant composition comprising two or more surfactants selected from the group consisting of Surfactant A compounds, Surfactant B compounds, and Surfactant C compounds. In certain exemplary embodiments, the emulsions comprise water, a water-immiscible liquid, one or more polymers, and an inverting surfactant composition comprising three or more surfactants selected from the group consisting of Surfactant A compounds, Surfactant B compounds, and Surfactant C compounds. In certain exemplary embodiments, the emulsions comprise water, a water-immiscible liquid, one or more polymers, and an inverting surfactant composition comprising four or more surfactants selected from the group consisting of Surfactant A compounds, Surfactant B compounds, and Surfactant C compounds. The emulsion may optionally comprise inhibitors, emulsifiers, salts and/or other surfactants.

In exemplary embodiments, the emulsion comprises: water; a water-immiscible liquid; greater than about 10% by weight one or more polymers; about 0.1% to about 5% by weight an inverting surfactant composition described herein. In exemplary embodiments, the emulsion comprises: water; a water-immiscible liquid; greater than about 10% by weight one or more polymers; about 0.1% to about 5%, about 1% to about 4%, or about 1.5% to about 3.5%, by weight an inverting surfactant composition comprising one or more surfactants selected from the group consisting of Surfactant A compounds, Surfactant B compounds, and Surfactant C compounds. In exemplary embodiments, the amounts of each individual inverting surfactant included in the emulsion, when two or more exemplary inverting surfactants are used can vary as necessary, for example, each exemplary inverting surfactant can be present in an amount of about 0.01 to about 5%, 0.01 to about 3%, or about 0.02 to about 2%, by weight, based on the total emulsion.

The water present in the emulsions generally includes freshwater, but saltwater or combinations with saltwater also may be used. Generally, the water used may be from any source, provided that it does not contain an excess of compounds that may adversely affect other components in the emulsion. In some embodiments, the water may be present in the emulsion in an amount in the range of from about 1% to about 50%, about 1% to about 12%, about 3% to about 50%, about 3% to about 12%, about 1% to about 5%, about 12% to about 50%, or about 30% to about 50% by weight of the emulsion. In some embodiments, the emulsion composition may have less than about 30%, about 20%, about 12%, about 10%, about 7%, about 5%, or about 3% by weight water. In some embodiments, the emulsion composition may have greater than about 1%, about 2%, about 3%, about 5%, about 7%, about 10%, about 12%, or about 20%, by weight water. In certain exemplary embodiments, the emulsion can be water-free or at least substantially water-free. In embodiments wherein the amount of water in the emulsion is kept to a very small amount, the emulsion may be in the form of a liquid dispersion polymer composition or a liquid polymer composition.

Suitable water-immiscible liquids may include, but are not limited to, water-immiscible solvents, such as paraffin hydrocarbons, naphthene hydrocarbons, aromatic hydrocarbons, olefins, oils, stabilizing surfactants and mixtures thereof. The paraffin hydrocarbons may be saturated, linear, or branched paraffin hydrocarbons. Examples of suitable aromatic hydrocarbons include, but are not limited to, toluene and xylene. In one embodiment, the water-immiscible liquid is an olefin and paraffin blend. In one embodiment, the water-immiscible liquid comprises oil and one or more emulsifiers. The water-immiscible liquid may be present in the emulsion in an amount sufficient to form a stable emulsion. In some embodiments, the water-immiscible liquid may be present in the emulsions in an amount in the range of from about 20% to about 60%, about 25% to about 55%, about 35% to about 55%, or about 20% to about 30% by weight.

In exemplary embodiments, the emulsion comprises one or more emulsifiers. Emulsifiers, among other things, in the emulsion, lower the interfacial tension between the water and the water-immiscible liquid so as to facilitate the formation of a water-in-oil polymer emulsion. In exemplary embodiments, the emulsifier is not a compound of Surfactants A, B, or C. The emulsifier should be present in an amount sufficient to provide the desired stable water-in-oil polymer emulsion. In some embodiments, the emulsifier may be present in an amount in the range of from about 0.5% to about 5% by weight of the emulsion.

The polymer should be present in the emulsion in an amount that does not undesirably impact the emulsion's stability. In exemplary embodiments, the one or more polymers may be present in an amount in the range of from about 10% to about 80%, about 10% to about 35%, about 15% to about 30%, or about 20% to about 30%, about 39% to about 80%, or about 40% to about 60%, or about 45% to about 55%, by weight of the emulsion. In exemplary embodiments, the emulsion may comprise greater than about 35%, about 39%, 40%, 41%, 42%, 43%, 44%, 45%, 46%, 47%, 48%, 49%, 50%, 51%, 52%, 53%, 54%, 55%, 56%, 57%, 58%, 59% or about 60% or higher, by weight polymer. In exemplary embodiments, the emulsion may comprise less than about 35%, or about 30%, or less, by weight polymer.

In certain exemplary embodiments, the emulsions may further comprise one or more organic or inorganic salts. In certain exemplary embodiments, the emulsions comprise at least about 0.5% of one or more organic or inorganic salts. In exemplary embodiments, the emulsions comprise one or more organic or inorganic salts in an amount about 0.5% to about the point of saturation in the emulsion. Representative organic or inorganic salts include but are not limited to sodium chloride, sodium sulfate, sodium bromide, ammonium sulfate, ammonium chloride, lithium chloride, lithium bromide, potassium chloride, potassium bromide, magnesium sulfate, aluminum sulfate, ammonium hydrogen phosphate, sodium hydrogen phosphate, potassium hydrogen phosphate, sodium salts, lithium salts, potassium salts, magnesium salts, aluminum salts, ammonium salts, phosphate salts, sulfate salts, chloride salts, fluoride salts, citrate salts, acetate salts, tartrate salts, hydrogen phosphate salts, water soluble inorganic salts, other inorganic salts, other organic salts and mixtures thereof. In exemplary embodiments, the one or more organic or inorganic salts includes ammonium chloride.

In some embodiments, emulsion polymerization may be used to prepare exemplary emulsions. Suitable emulsion polymerization techniques may have a variety of different initiation temperatures depending on, among other things, the amount and type of initiator used, the amount and type of monomers used, and a number of other factors known to those of ordinary skill in the art. In one embodiment, a suitable emulsion polymerization technique may have an initiation temperature of about 25° C. Due to the exothermic nature of the polymerization reaction, the mixture may be maintained at a higher temperature than the initiation temperature during procession of the polymerization reaction, for example, in the range of from about 30° C. to about 70° C., or from about 40° C. to about 60° C.

In exemplary embodiments, the one or more polymers are in the form of a emulsion, such as a polyacrylamide emulsion. In exemplary embodiments, the emulsion comprises a hydrophilic polymer contained within water droplets that are dispersed in a continuous oil phase. In exemplary embodiments, the one or more polymers are in the form of an aqueous dispersion, for example an aqueous polymer dispersion prepared by solution polymerization. Methods for the preparation of exemplary aqueous polymer dispersions are well known in the art, for example as described in U.S. Pat. No. 5,200,448.

In exemplary embodiments, any suitable emulsion polymerization method may be employed in the preparation of the one or more polymers described here. Descriptions of the steps of an exemplary emulsion preparation provided herein, but are not intended to be limiting with respect to the methods for preparing the exemplary one or more polymers.

A preliminary emulsion is made by homogenizing oil and aqueous phases. The oil phase of the emulsion, which generally comprises from about 5 to about 35 percent by weight of the total emulsion, is comprised of one or more inert hydrophobic liquids. Preferably, the oil phase comprises about 20 to 30 percent of the emulsion. The oil used may be selected from a large class of organic liquids which are immiscible with water, including liquid hydrocarbons and substituted liquid hydrocarbons. Representative examples of such oils include benzene, xylene, toluene, mineral oils, kerosenes, naphthas, chlorinated hydrocarbons, such as perchloroethylene, and the like.

The oil phase may contain one or more primary or emulsifying surfactants, i.e. conventional emulsion polymerization stabilizers. Such stabilizers are well known to the art to promote the formation and stabilization of water-in-oil emulsions. Normally such emulsifiers have HLB values in the range of about 2 to about 10, preferably less than about 7. Suitable such emulsifiers include the sorbitan esters, phthalic esters, fatty acid glycerides, glycerine esters, as well as the ethoxylated versions of the above and any other well-known relatively low HLB emulsifier. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions thereof containing 1 to 10 moles of ethylene oxide per mole of the basic emulsifier. Thus, any emulsifier may be utilized which will permit the formation of the initial emulsion and stabilize the emulsion during the polymerization reaction.

These primary surfactants are used alone or in mixtures and are utilized in amounts of not greater than about 5%, about 4%, about 3%, about 2% or about 1% by weight of the total emulsion.

The aqueous phase generally comprises about 95 to 65% by weight of the initial emulsion. Preferably, it comprises about 80 to 70% thereof. In addition to water, the aqueous phase contains the monomers being polymerized, generally in an amount of less than about 50%, about 15 to about 40%, or about 22 to about 35%, by weight of the total emulsion, and generally chain transfer agents, initiators and sequesterants. Alternatively, the chain transfer agents, initiators and sequesterants may be added to the system after the preliminary emulsion has been prepared. The initiator may also be added continuously during the polymerization to control the rate of polymerization depending upon the particular monomers used and their reactivities.

Alternatively, the initiator may be present in either the oil or the aqueous phase with the monomers being added either continuously or incrementally thereafter. All of these variations are well known in the art.

The monomers suitable for use in the preparation of the exemplary polymers are described herein.

Any conventional chain transfer agent may be employed, such as propylene glycol, isopropanol, 2-mercaptoethanol, sodium hypophosphite, dodecyl mercaptan and thioglycolic acid. The chain transfer agent is generally present in an amount of about 0.1 to 10 percent by weight of the total emulsion, though more may be used.

The initiator may be any free radical producing material well known in the art. The preferred free radical initiators are the redox-type and the azo-type polymerization initiators and they are generally used in an amount of about 0.0005 to 0.5 percent by weight of the total emulsion. Radiation may also be used to initiate the reaction.

Any conventional sequesterant may also be present in the aqueous phase, such as ethylenediaminetetraacetic acid or pentasodium diethylenetriamine pentaacetate. The sequesterant is generally present in an amount of about 0.01 to 2 percent by weight of the total emulsion, though more may be utilized.

Following preparation of the preliminary emulsion, polymerization of the monomers is commenced at a temperature sufficiently high to break down the initiator to produce the desired free radicals. Generally a suitable temperature is about −20° C. to about 200° C., or about 20° C. to 100° C.

Preferably the polymerization is run at a pH of about 2 to 12 and a suitable amount of base or acid may be added to the preliminary emulsion to achieve the desired pH. The polymerization is usually completed in about an hour or two to several days, depending upon the monomers employed and other reaction variables. It is generally carried out at atmospheric pressure, but higher pressures are advantageously used when volatile ingredients are involved.

In certain exemplary embodiments, once polymerization is complete, the amount of water in the emulsion may be reduced or removed as desired. For example, the water can be removed to a level of less than about 12%, or less than about 10%, or less than about 7%, or less than about 5%, or less than about 3% by weight. In exemplary embodiments, the removal of water is carried out by any suitable means, for example, at reduced pressure, e.g. at a pressure of about 0.00 to about 0.5 bars, or about 0.05 to about 0.25 bars. The temperature for water removal steps may typically be from about 50° C. to about 150° C., although techniques which remove water at higher temperatures may be used.

Following completion of the polymerization, the pH of the emulsion may be adjusted as desired. For an anionic polymer emulsion, this is generally about 4 to 10; for cationic emulsions about 2.0 to 5.5; and for non-ionic emulsions about 2.0 to 7.0. A breaker or inverting surfactant, or blend of inverting surfactants, is generally added to yield a single package of final product. In exemplary embodiments, an inverting surfactant composition, as described herein, is added to the polymer emulsion. Other suitable breaker or inverting surfactants may be used in combination with the exemplary polymer and exemplary inverting surfactant composition in the emulsion. As described herein, the total amount of inverting surfactants present in the emulsion is about 0.1 to about 5% by weight, based on the total emulsion.

Once prepared, the emulsions of the present embodiments may be chemically modified in any known manner. "Chemically modified" is intended to cover further treatment of the dispersed water-soluble polymer and/or the addition of components to the dispersed water-soluble polymer which, without the stabilization provided by the emulsion stabilizers, would cause the normally water-soluble polymeric particles to coagulate or agglomerate. Examples of such further treatments are disclosed in U.S. Pat. Nos. 4,052,353 and 4,171,296, incorporated herein by reference. The emulsion of the present embodiments may also be concentrated in any suitable manner, such as is disclosed in U.S. Pat. No. 4,021,399, incorporated herein by reference.

A variety of different mixtures may be used to prepare an emulsion for use in the present embodiments. Suitable mixtures may include acrylamide, other monomers, water, a water-immiscible liquid, an initiator, and an emulsifier. Generally the one or more ethoxylated amine compounds can be combined with one or more inverting surfactants to form the inverting surfactant composition. The inverting surfactant composition can be added to the polymer emulsion to form a mixture. Optionally, the mixture further may comprise, a base (e.g., sodium hydroxide) to neutralize the monomers in acid form such that the salt of the monomer is not formed, a complexing agent to allow the gradual release of monomers in the polymerization reaction, an activator to initiate polymerization at a lower temperature, and an inverter. Those of ordinary skill in the art, with the benefit of this disclosure, will, know the amount and type of components to include in the mixture based on a variety of factors, including the desired molecular weight and composition of the polymer and the desired initiation temperature.

Generally, the exemplary emulsions are particularly suitable for use in brine. The exemplary emulsions may be used in a range of temperatures, for example between about 5 and about 99° C., or about 50 and about 95° C.

In certain exemplary embodiments, the emulsion may be used in combination with a proppant.

Treatment Fluids

The treatment fluid, for example an aqueous treatment fluid, containing the emulsions described herein, can be used in any well treatment fluid, including but not limited to stimulation, production and completion operations. For example, the well treatment fluid can be used for hydraulic fracturing applications or in an application where friction reduction is desired. Conventional fracturing fluids typically contain natural or synthetic water soluble polymers, which are well known in the art. Water soluble polymers viscosify the aqueous liquids at relatively low concentrations due to their high molecular weight.

In an exemplary embodiment, the treatment fluid comprises water and an exemplary emulsion described herein. The treatment fluids may be prepared by mixing an exemplary emulsion with water. The additional water that is mixed with the emulsion to form the treatment fluid may be freshwater, saltwater (e.g. water containing one or more salts dissolved therein), brine (e.g. produced from subterranean formations), seawater, or combinations thereof. Generally, the water used may be from any source, provided that it does not contain an excess of compounds that may adversely affect other components in the aqueous treatment fluid or the formation itself. In certain exemplary embodiments, the water is brine with a total dissolved solids content (TDS) of about 5,000 to about 300,000 ppm, or about 100,000 to about 260,000 ppm. In certain exemplary embodiments, the total divalent cationic species content of the brine is in the range of about 5,000 to about 100,000 ppm, or about 10,000 to about 50,000 ppm.

In exemplary embodiments, the polymer may be present in the treatment fluid in an amount of about 0.01% to about 1% by weight of the treatment fluid.

In these applications, the treatment fluid, can be configured as a gelled fluid, such as a linear gel, a crosslinked gel, or a foamed gel fluid; acidic fluids, water and potassium chloride treatments, and the like. The fluid is injected at a pressure effective to create one or more fractures in the subterranean formation. Depending on the type of well treatment fluid utilized, various additives may also be added to the fracturing fluid to change the physical properties of the fluid or to serve a certain beneficial function. In one embodiment, the fluid does not contain a sufficient amount of water soluble polymer to form a gel.

In exemplary embodiments, the treatment fluid comprises a proppant.

In various exemplary embodiments, the proppants may be finely sized sand. Generally sand is referred to by the size of mesh which the sand will pass through, and the size of mesh which the sand will not pass through. Typically, a 20-40 mesh sand is used but other sizes, such as 40-50 or 40-60, may be utilized. Sand is also characterized by the "roundness" of the sand particles. Generally rounder sand is utilized in order to create more uniform void spaces between the particles and therefore better permeability within the propped fracture. Fracturing fluids also contain, for example, viscosifiers to slow the rate at which sand will separate from the fluids and permit the sand to be carried farther into the fractures.

In other exemplary embodiments, other types of proppants may be used. For example, the proppant may be a ceramic proppant. The proppant may be a coated proppant, such as proppants with coatings with low coefficients of friction in order to reduce erosion caused by the fracturing fluid. Coatings also may be used to make the sand particles more round. Examples of such coatings include antimony trioxide, bismuth, boric acid, calcium barium fluoride, copper, graphite, indium, fluoropolymers (FTFE), lead oxide, lead sulfide, molybdenum disulfide, niobium dielenide, polytetrafluoroethylene, silver, tin, or tungsten disulfide or zinc oxide. Ceramic proppants are suggested, for example, in U.S. Pat. No. 4,555,493 to Watson et al., and low density ceramic proppants are suggested in U.S. Pat. No. 8,420,578 to Usova et al.

Fracturing fluids may also contain other components as necessary or desired. For example, the fracturing fluids may contain acids for breaking the thickening polymers, salts such as calcium chlorides to increase the density of the fluids, corrosion inhibitors or other additives in the fracturing fluids.

Also, fluid loss agents may be added to partially seal off the more porous sections of the formation so that the fracturing occurs in the less porous strata. Other oilfield additives that may also be added to the fracturing fluid include emulsion breakers, antifoams, scale inhibitors, $H_2S$ and or $O_2$ scavengers, biocides, crosslinking agents, surface tension reducers, buffers, fluorocarbon surfactants, clay stabilizers, fluid loss additives, foamers, friction reducers, temperature stabilizers, diverting agents, shale and clay stabilizers, paraffin/asphaltene inhibitors, corrosion inhibitors, and acids. For example, an acid may be included in the aqueous treatment fluids, among other things, for a matrix or fracture acidizing treatment. In fracturing embodiments, propping agent may be included in the aqueous treatment fluids to prevent the fracture from closing when the hydraulic pressure is released. In a particular embodiment, the treatment fluid further comprises a biocide.

Methods of Use

The emulsions and treatment fluids of the present embodiments may be used in any subterranean treatment. Such subterranean treatments include, but are not limited to, drilling operations, stimulation treatments, and completion operations. Those of ordinary skill in the art, with the benefit of this disclosure, will be able to recognize a suitable subterranean treatment. In exemplary embodiments, the emulsion comprises: water; a water-immiscible liquid; about 10% to about 80% by weight one or more polymers; and about 0.1% to about 5% by weight an exemplary inverting surfactant composition described herein.

In exemplary embodiments, the methods may further comprise preparing the treatment fluid, or aqueous treatment fluid. Preparing the treatment fluid may comprise providing an emulsion as described herein, and combining the emulsion with water to form the treatment fluid.

In exemplary embodiments, a method of treating a portion of a subterranean formation comprises: providing a treatment fluid of the present embodiments comprising an emulsion as described herein, and introducing the treatment fluid into the portion of the subterranean formation. In some embodiments, the treatment fluid may be introduced into the portion of the subterranean formation at a rate and pressure sufficient to create or enhance one or more fractures in the portion of the subterranean formation. The portion of the subterranean formation that the treatment fluid is introduced will vary dependent upon the particular subterranean treatment. For example, the portion of the subterranean formation may be a section of a well bore, for example, in a well bore cleanup operation. In the stimulation embodiments, the portion may be the portion of the subterranean formation to be stimulated. In exemplary embodiments, the treatment fluid may be introduced into the portion of the subterranean formation at a rate of about 30 bpm to about 250 bpm, or about 50 bpm to about 175 bpm.

In exemplary embodiments, a method of treating a subterranean formation comprises: providing a treatment fluid comprising an exemplary emulsion described herein; and introducing the treatment fluid into a subterranean formation.

In exemplary embodiments, a method of fracturing a subterranean formation comprises: (a) providing an exemplary emulsion as described herein; (b) mixing the emulsion with additional water to form a treatment fluid, wherein the one or more polymers are present in the treatment fluid in an amount of about 0.01% to about 1% by weight of the treatment fluid; and (c) introducing the treatment fluid into a subterranean formation at or above a pressure sufficient to create one or more fractures in the subterranean formation. In exemplary embodiments, the treatment fluid comprises brine. In exemplary embodiments, the exemplary emulsion or treatment fluid comprises proppant. In certain exemplary embodiments, a propping agent (or proppant) such as sand or other hard material is added to the exemplary emulsions or treatment fluids which serves to keep the fractures open after the fracturing operation.

The fractures produced may be propped using proppants, or the fracturing fluid may include reactants to react with the surface of the rock faces to result in permeability along the fracture. The fractures may be utilized in vertical or horizontal wells, to produce natural gas, light tight oil, or for injection of fluids into the formation.

Fracturing, or fracking, of formations is generally accomplished by injection of a slurry of fracturing fluid and proppant into the formation at pressures sufficiently great to exceed the tensile strength of the formation and cause the formation to separate at the point of the perforations. Formations will generally have a direction where the formation is under the least amount of stress, and the fracture will initially propagate in a plane perpendicular to the direction of such least stress. In deep formations, the weight of the overburden will generally assure that the direction of minimal stress is a horizontal direction. It is generally the goal to provide horizontal wellbores in such formation in the direction of the minimal formation stress so that fractures from the wellbore will tend to be perpendicular to the wellbore. This allows access to the maximum possible volume of formation from a horizontal wellbore of a limited length.

Any method for hydraulic fracturing of formations known in the art may utilize the exemplary emulsions and treatment fluids.

Propagation of fractures is typically halted or at least inhibited by interfaces between formations because the force exerted at the tip of the fracture can be dispersed at the interface of the formations. Larger fractures may therefore tend to have more rectangular shapes rather than disk shapes as the dimensions of the fracture exceed the height of the formation, and the fracture therefore grows laterally rather than continuing to grow vertically.

In exemplary embodiments, methods for improving friction reduction properties of a treatment fluid, comprising: (i) providing an exemplary emulsion as described herein; and (ii) inverting the emulsion in the treatment fluid comprising brine. In certain embodiments, the resultant treatment fluid has an improvement in friction reduction, when compared to a similar treatment fluid in which the inverted emulsion is other than an exemplary inverting surfactant composition as described herein.

In certain embodiments, the emulsion further comprises an emulsifier. In one embodiment, the improved friction reduction property is the percent friction reduction of the treatment fluid. In one embodiment, the improved friction reduction property is the time to achieve maximum friction reduction, or a desired percentage of the maximum friction reduction, for example 90%. In certain exemplary embodiments, the methods described herein provide an energy savings over methods which utilize a similar treatment fluid in which the inverted emulsion is other than an exemplary inverting surfactant composition as described herein.

In exemplary embodiments, a method for improving friction reduction properties of a treatment fluid comprises: (i) providing an emulsion comprising: water; a water-immiscible liquid; one or more polymers; and an inverting surfactant composition comprising two or more surfactants selected from the group consisting of Surfactant A compounds, Surfactant B compounds, and Surfactant C compounds; and (ii) inverting the emulsion in the treatment fluid comprising brine; wherein the resultant treatment fluid has an improvement in friction reduction, when compared to a similar treatment fluid in which the emulsion that does not contain an inverting surfactant composition comprising two or more surfactants selected from the group consisting of Surfactant A compounds, Surfactant B compounds, and Surfactant C compounds.

In exemplary embodiments, a method for improving friction reduction properties of a treatment fluid comprises: (i) providing an emulsion comprising: water; a water-immiscible liquid; one or more polymers; and an inverting surfactant composition comprising two or more surfactants comprising Surfactant B1 and Surfactant B2 compounds; and (ii) inverting the emulsion in the treatment fluid comprising brine; wherein the resultant treatment fluid has an improvement in friction reduction, when compared to a similar treatment fluid in which the emulsion that does not contain an inverting surfactant composition comprising two or more surfactants comprising Surfactant B1 and Surfactant B2 compounds.

The inverting surfactant compositions, emulsions and treatment fluids of the present embodiments may have various uses, for example in crude oil development and production from oil bearing formations that can include primary, secondary or tertiary (enhanced) recovery. Chemical techniques, including for example injecting surfactants (surfactant flooding) to reduce interfacial tension that prevents or inhibits oil droplets from moving through a reservoir or injecting polymers that allow the oil present to more easily mobilize through a formation, can be used before, during or after implementing primary and/or secondary recovery techniques. Such techniques can also be used for enhanced oil recovery, or to complement other enhanced oil recovery techniques.

The inverting surfactant compositions, emulsions and treatment fluids of the present embodiments may be used in any oil recovery technique, for example an oil recovery technique where the reduction of friction or interfacial tension is desired, or where mobilization of oil is desired. In exemplary embodiments, a method comprising using an inverting surfactant composition, emulsion or treatment fluid as described herein may be utilized for oil recovery, including but not limited to enhanced oil recovery. In exemplary embodiments, the method comprises providing a treatment fluid comprising an emulsion comprising one or more polymers and an exemplary inverting surfactant composition described herein; and introducing the treatment fluid into a subterranean formation; and recovering hydrocarbons from the subterranean formation. In exemplary embodiments, the method comprises providing an emulsion comprising one or more polymers and an exemplary inverting surfactant composition described herein; and introducing the emulsion into a subterranean formation; and recovering hydrocarbons from the subterranean formation.

In certain exemplary embodiments, the methods further comprise adding a proppant.

The term "brine" or "aqueous brine" as used herein refers to sea water; naturally-occurring brine; a chloride-based, bromide-based, formate-based, or acetate-based brine containing monovalent and/or polyvalent cations or combinations thereof. Examples of suitable chloride-based brines include without limitation sodium chloride and calcium chloride. Further without limitation, examples of suitable bromide-based brines include sodium bromide, calcium bromide, and zinc bromide. In addition, examples of formate-based brines include without limitation, sodium formate, potassium formate, and cesium formate.

The following examples are presented for illustrative purposes only, and are not intended to be limiting.

EXAMPLES

In these examples, the impact of exemplary inverting surfactant compositions on inversion properties of certain polymer emulsion compositions is evaluated by measuring the friction reduction performance of polymer emulsions.

Materials and Methods for Examples 1 and 2

I. Brine

Three types of brine were used in the examples (Brine 1, Brine 2, and Brine 3). The composition of each brine is provided in Table 1.

TABLE 1

Brine compositions

| Sample | Na (ppm) | K (ppm) | Mg (ppm) | Ca (ppm) | Sr (ppm) | Ba (ppm) | Fe (ppm) | Cl (ppm) | SO$_4$ (ppm) | TDS divalent cationic (ppm) | TDS total (ppm) |
|---|---|---|---|---|---|---|---|---|---|---|---|
| Brine 1 | 41,675 | 17,820 | — | 10,467 | — | — | 110 | 34,713 | 190 | 10,577 | 104,975 |
| Brine 2 | 38,829 | 566 | 1,734 | 16,893 | 2,866 | 836 | 143 | 101,269 | 5 | 22,472 | 163,141 |
| Brine 3 | 41,240 | — | 11,712 | 35,360 | 129 | 1,740 | 301 | 163,200 | — | 49,242 | 253,682 |

II. Polymer Emulsions

A polyacrylamide emulsion was prepared by addition of a monomer phase to a surfactant containing oil phase with homogenization. The resulting monomer emulsion was polymerized using free radical polymerization chemistry in the presence of adequate agitation and cooling, which resulted in a high molecular weight anionic polymer emulsion. The polymerization of acrylamide and co-monomers in an inverse emulsion resulted in a polymer emulsion containing sterically stabilized inverse lattices. The average particle size of the inverse emulsions was typically 0.7-1.5 micron. After polymerization, an inverting surfactant system was added to allow for rapid dilution and dissolution in water.

III. Friction Loop Testing

The friction loop is a laboratory instrument designed to simulate well fracturing flow conditions. Fracturing in the field often requires pumping over 50 barrels per minute through a −4.5" bore which results in a highly turbulent flow (Reynolds number: 500,000 to 5,000,000). Although it is not possible to achieve this kind of flow in the lab, the friction loop designed simulates the field conditions to the maximum known extent (Reynolds number: 120,000). The data generated by this laboratory scale friction loop is accurate and widely accepted by the industry. The main components of the friction loop are: pump, magnetic flow meter and a differential pressure transmitter to create and monitor necessary conditions. All pipes and other components are constructed using stainless steel 316 L/304 L material.

To test the friction reduction property of the polymer, the friction loop reservoir was filled with 20 L of the required brine (see above table for recipes of various brines). This brine was then re-circulated through the friction loop at a flow rate of 24 gallons per minute across a five-foot section of half-inch diameter pipe (required to generate the above mentioned Reynolds number). The baseline pressure drop was measured. The exemplary emulsion containing polymer was now added (at a measured concentration of 0.5 gallons of polymer per thousand gallons of brine or 0.5 GPTG) to the recirculating brine solution, where it inverted and dissolved. The degree of friction reduction (% FRO at a given time 't' was calculated from the initial pressure drop $\Delta Pi$ and the pressure drop at time t, $\Delta Pt$ using the equation:

$$\% FR_t = \frac{\Delta P_i - \Delta P_t}{\Delta P_i} \times 100$$

Example 1

A cationic polyacrylamide emulsion with a 10 mole % charge was prepared according to standard emulsion procedure without any inverting surfactants. This base emulsion was used to prepare Sample 1 and Sample 2, which included the inverting surfactants as shown in Table 2. Similarly, an anionic base polyacrylamide emulsion with a 15 mole % charge was prepared without any inverting surfactants and this base was used to prepare Sample 3 with the inverting surfactants shown in Table 2. The performance parameters of friction reduction, which include the Max FR (maximum friction reduction), $t_{90}$ (time to 90% friction reduction, a simple measure of inversion rate) and $t_{max}$ (time to maximum friction reduction) were measured in Brine 1, Brine 2 and Brine 3 with different TDS at a dosage of 0.5 gptg and at 77° F.±3° F. Sample 1 contained 3 wt % of the Surfactants A, B1, B2 and C. Sample 2 contained 2 wt % of Surfactants A, B1 and C. Sample 3 contained 3 wt % of Surfactants A and B 1. The results of the friction reduction experiments are provided in Tables 2 and 3, as well as in FIGS. 1-5.

TABLE 2

Friction Reduction Performance of Polymer Emulsions with Exemplary Inverting Surfactant Compositions

| Sample | Surfactant A (wt %) | Surfactant B1 (wt %) | Surfactant B2 (wt %) | Surfactant C (wt %) | Water | Max FR (%) | $T_{max}$ (s) | $T_{90}$ (s) |
|---|---|---|---|---|---|---|---|---|
| 1 | 30 | 30 | 10 | 30 | Brine 1 | 61 | 38 | 22 |
| 1 | 30 | 30 | 10 | 30 | Brine 2 | 52 | 30 | 16 |
| 1 | 30 | 30 | 10 | 30 | Brine 3 | 57 | 54 | 28 |
| 2 | 30 | 40 | 0 | 30 | Brine 1 | 58 | 51 | 31 |
| 2 | 30 | 40 | 0 | 30 | Brine 2 | 54 | 90 | 42 |
| 2 | 30 | 40 | 0 | 30 | Brine 3 | 55 | 103 | 50 |
| 3 | 30 | 70 | 0 | 0 | Brine 1 | 60 | 53 | 32 |
| 3 | 30 | 70 | 0 | 0 | Brine 2 | 59 | 54 | 34 |
| 3 | 30 | 70 | 0 | 0 | Brine 3 | 49 | 115 | 58 |

TABLE 3

Friction Reduction Performance of Polymer Emulsions with
Comparative Anionic or Cationic Inverting Surfactant

| Sample | Water | MaxFR (%) | $T_{max}$ (s) | $T_{90}$ (s) |
|---|---|---|---|---|
| Anionic Comparative | Brine 1 | 53 | 92 | 48 |
| Anionic Comparative | Brine 2 | 47 | 48 | 27 |
| Anionic Comparative | Brine 2 | 45 | 61 | 35 |
| Cationic Comparative | Brine 1 | 41 | 366 | 155 |
| Cationic Comparative | Brine 2 | 50 | 210 | 74 |
| Cationic Comparative | Brine 3 | 58 | 71 | 37 |

Example 2

Figure 6:
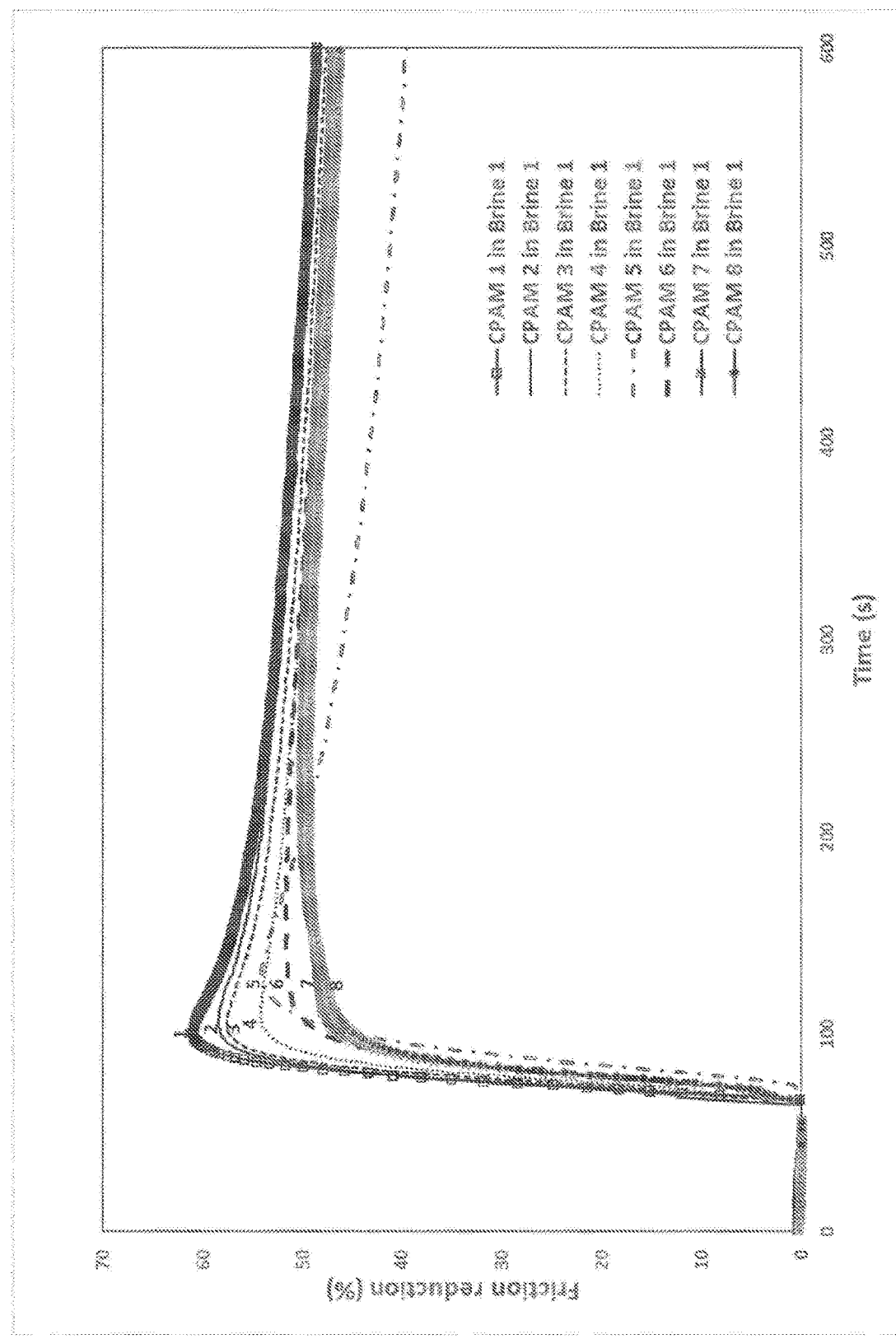
FIG. 6 shows the friction reduction profiles of samples of cationic emulsion polyacrylamides with several exemplary inverting surfactant compositions in brine.

A cationic polyacrylamide emulsion with a 10 mole % charge was prepared according to standard emulsion procedure without any inverting surfactants. This base emulsion was used to prepare CPAM1-CPAM8 samples with the 3 wt % of inverting surfactant proportions as shown in Table 4. The surfactant compositions were premixed prior to addition to the emulsion. The friction reduction parameters for each sample were measured in Brine 1 at 77° F.±3° F. at a dosage of 0.5 gptg. The results are shown in FIG. 6.

TABLE 4

Friction Reduction Performance of Polymer Emulsions with
Exemplary Inverting Surfactant Compositions

| Sample | Proportion of Inverting Surfactants A:B:C (wt %) | Max FR(%) | $T_{max}$ (s) | $T_{90}$ (s) |
|---|---|---|---|---|
| CPAM1 | 20:40:40 | 61 | 41 | 25 |
| CPAM2 | 30:40:30 | 58 | 50 | 28 |
| CPAM3 | 0:50:50 | 58 | 45 | 27 |
| CPAM4 | 0:40:60 | 54 | 50 | 28 |
| CPAM5 | 0:100:0 | 54 | 70 | 44 |
| CPAM6 | 0:30:70 | 52 | 83 | 36 |
| CPAM7 | 30:30:40 | 50 | 169 | 36 |
| CPAM8 | 20:30:50 | 50 | 179 | 38 |

Example 3

Figure 7:
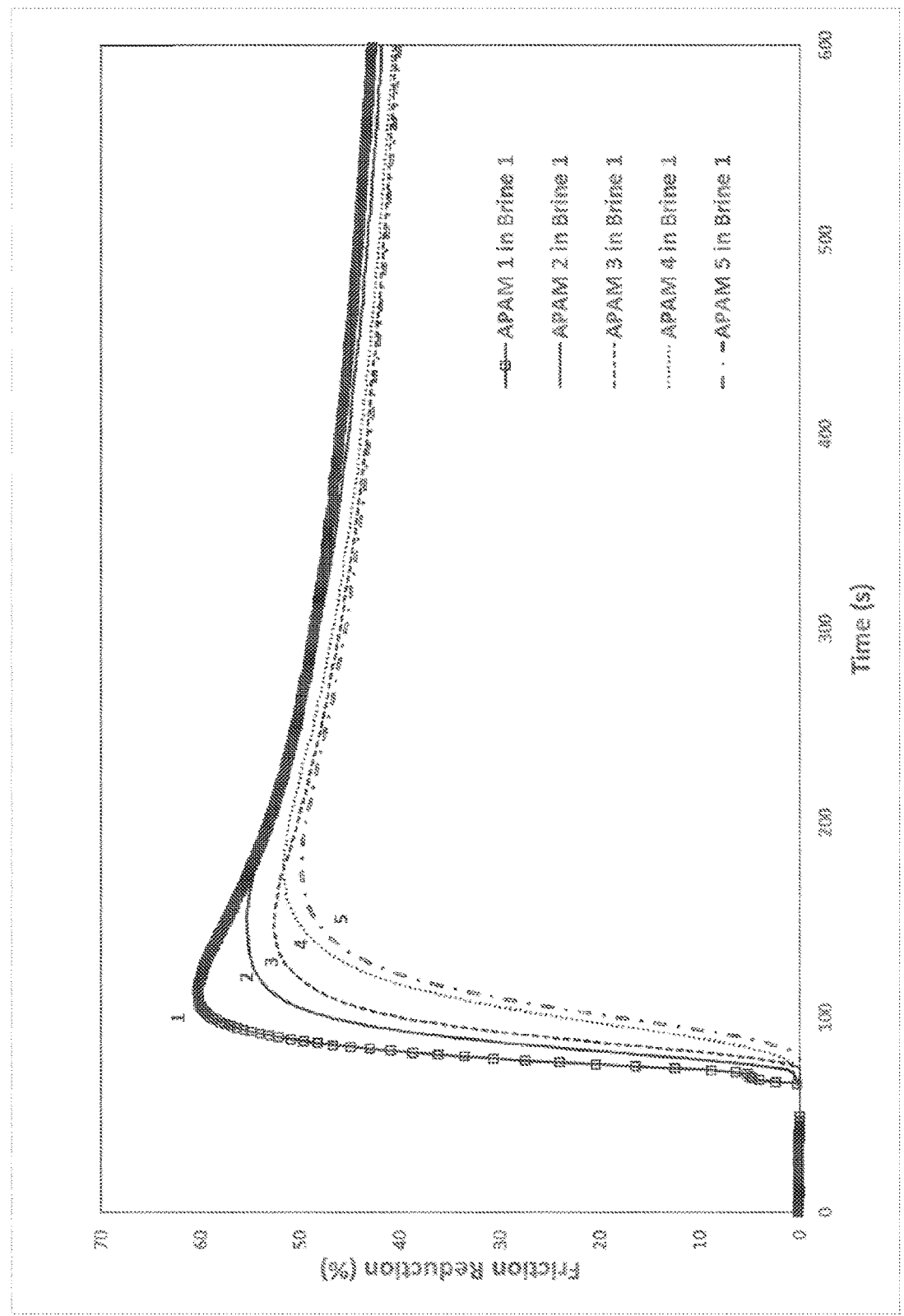
FIG. 7 shows the friction reduction profiles of samples of amomc emulsion polyacrylamides with several exemplary inverting surfactant compositions in brine.

An anionic polyacrylamide emulsion with a 15 mole % charge was prepared according to standard emulsion procedure without any inverting surfactants. This base emulsion was used to prepare APAM1-APAM5 samples with the 3 wt % of inverting surfactant proportions as shown in Table 5. The surfactant compositions were premixed prior to addition to the emulsion. The friction reduction parameters for each sample were measured in Brine 1 at 77° F.±3° F. at a dosage of 0.5 gptg. The results are shown in FIG. 7.

TABLE 5

Friction Reduction Performance of Polymer Emulsions with
Exemplary Inverting Surfactant Compositions

| Sample | Proportion of Inverting Surfactants A:B:C (wt %) | Max FR(%) | $T_{max}$ (s) | T90 (s) |
|---|---|---|---|---|
| APAM1 | 30:70:0 | 60 | 53 | 32 |
| APAM2 | 30:50:20 | 55 | 91 | 45 |
| APAM3 | 30:40:30 | 53 | 87 | 50 |
| APAM4 | 10:60:30 | 52 | 117 | 71 |
| APAM5 | 0:60:40 | 50 | 117 | 73 |

In the preceding specification, various embodiments have been described with reference to the examples. It will, however, be evident that various modifications and changes may be made thereto, and additional embodiments may be implemented, without departing from the broader scope of the exemplary embodiments as set forth in the claims that follow. The specification and drawings are accordingly to be regarded in an illustrative rather than restrictive sense.

What is claimed is:

1. A treatment fluid comprising an emulsion, the emulsion comprising:
    water;
    a water-immiscible liquid;
    about 10% to about 80% one or more polymers by weight of the emulsion; and
    about 0.1% to about 5% of an inverting surfactant composition by weight of the emulsion, said inverting surfactant composition comprising one or more surfactants selected from the group consisting of alkyl polyethyleneglycol ether carboxylic acid compounds.

2. The treatment fluid of claim 1, wherein the inverting surfactant composition further comprises at least one surfactant selected from the group consisting of ethoxylated amine compounds and salts or esters thereof.

3. The treatment fluid of claim 2, wherein the ethoxylated amine compound is present in an amount of from about 5 wt % to about 75 wt % of the inverting surfactant composition.

4. The treatment fluid of claim 2, wherein the ethoxylated amine compounds are compounds of Formula I:

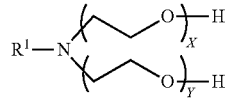

Formula I wherein $R^1$ is H, aryl, or C(=O)-aryl; and X and Y are each independently 1-20.

5. The treatment fluid of claim 2, wherein the ethoxylated amine compound is polyoxyethylene tallow amine.

6. The treatment fluid of claim 2, wherein the inverting surfactant composition comprises about 5 to about 95 wt % one or more ethoxylated amine compounds, and about 5 to about 95 wt % one or more alkyl polyethyleneglycol ether carboxylic acid compounds, alkyl polyglycol ether carboxylic acid compounds, and salts or esters thereof.

7. The treatment fluid of claim 1, wherein the one or more of the polymers is an acrylamide-containing polymer.

8. The treatment fluid of claim 1, wherein the one or more polymers comprises acrylamide or partially hydrolyzed acrylamide and one or more anionic monomers.

9. The treatment fluid of claim 1, wherein the one or more polymers comprises acrylamide or partially hydrolyzed acrylamide and one or more cationic monomers.

10. The treatment fluid of claim 1, wherein the one or more polymers comprises acrylamide or partially hydrolyzed acrylamide and one or more monomers selected from the group consisting of acrylic acid and salts thereof.

11. The treatment fluid of claim 1, wherein the one or more polymers comprises acrylamide or partially hydrolyzed acrylamide, and acryloyloxyethyltrimethylammonium chloride.

12. The treatment fluid of claim 1, wherein the alkyl polyethyleneglycol ether carboxylic acid compounds is glycolic acid ethoxylate oleyl ether.

13. The treatment fluid of claim 1, wherein the inverting surfactant composition comprises or consists essentially of about 5 to about 95 wt % one or more alkyl polyethyleneglycol ether carboxylic acid compounds, alkyl polyglycol ether carboxylic acid compounds, and salts or esters thereof; and about 5 to about 75 wt % one or more ethoxylated fatty acid compounds.

14. The treatment fluid of claim 1, wherein the one or more polymers are present in the treatment fluid in an amount of about 10% to about 35% by weight of the emulsion.

15. The treatment fluid of claim 14, further comprising a proppant.

16. A method of treating a subterranean formation, comprising: providing a treatment fluid of claim 1; and introducing the treatment fluid into a subterranean formation.

17. A method of fracturing a subterranean formation, comprising:
   (i) providing a treatment fluid of claim 1;
   (ii) mixing the emulsion with additional water or brine to form a treatment fluid, wherein the one or more polymers are present in the treatment fluid in an amount of about 0.01% to about 1% by weight of the treatment fluid; and
   introducing the treatment fluid into a subterranean formation at or above a pressure sufficient to create one or more fractures in the subterranean formation.

18. The method of claim 16, wherein the treatment fluid comprises brine.

19. The method of claim 16, further comprising adding a proppant.

* * * * *